US012715512B2

(12) United States Patent
Hammond, Jr. et al.

(10) Patent No.: US 12,715,512 B2
(45) **Date of Patent: *Aug. 25, 2026**

(54) LIGHTWEIGHT VEHICLE

(71) Applicant: Textron Innovations Inc., Providence, RI (US)

(72) Inventors: Donny Lee Hammond, Jr., Augusta, GA (US); Sam Dean Smith, Martinez, GA (US); Trevor Douglas Roebuck, Evans, GA (US); Landon Niles Ball, North Augusta, SC (US)

(73) Assignee: TEXTRON INNOVATIONS INC., Providence, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/826,628

(22) Filed: Sep. 6, 2024

(65) Prior Publication Data

US 2024/0425112 A1 Dec. 26, 2024

Related U.S. Application Data

(63) Continuation of application No. 18/337,896, filed on Jun. 20, 2023, now Pat. No. 12,122,452, which is a (Continued)

(51) Int. Cl.

*B62D 21/02* (2006.01)
*B60G 3/06* (2006.01)
(Continued)

(52) U.S. Cl.

CPC ............... *B62D 21/02* (2013.01); *B60G 3/06* (2013.01); *B60G 3/10* (2013.01); *B60G 3/20* (2013.01);

(Continued)

(58) Field of Classification Search

CPC ........ B62D 21/02; B62D 21/11; B62D 25/20; B62D 63/025; B60G 3/06; B60G 3/10;

(Continued)

(56) References Cited

U.S. PATENT DOCUMENTS

| | | | |
|---|---|---|---|
| 862,556 | A | 8/1907 | Handy |
| 1,282,389 | A | 10/1918 | Dodge |

(Continued)

FOREIGN PATENT DOCUMENTS

| | | |
|---|---|---|
| CN | 3341753-D | 12/2003 |
| CN | 202294350 U | 7/2012 |

(Continued)

OTHER PUBLICATIONS

Garia Luxery Golf Car [retrieved May 1, 2019] from the internet: < URL http://www.garia.com/models/leisure/monaco/monaco/.

(Continued)

*Primary Examiner* — Timothy Wilhelm
(74) *Attorney, Agent, or Firm* — Foley & Lardner LLP

(57) ABSTRACT

A lightweight vehicle includes a pair of rear wheel assemblies, a pair of front wheel assemblies, a chassis, a front suspension system coupling the pair of front wheel assemblies to the chassis, a rear suspension system coupling the pair of rear wheel assemblies to the chassis, a frontmost seat supported by the chassis where the frontmost seat includes a first seat bottom and a first seat back, a rearmost seat supported by the chassis and facing forward where the rearmost seat includes a second seat bottom and a second seat back, a floorboard coupled the chassis, and an electric motor configured to drive the pair of rear wheel assemblies and at least partially positioned beneath the second seat bottom. At least a portion of the rearmost seat is located longitudinally rearward of an axis extending through a center of the pair of rear wheel assemblies.

23 Claims, 21 Drawing Sheets

Related U.S. Application Data continuation of application No. 16/383,041, filed on Apr. 12, 2019, now Pat. No. 11,767,060.

(51) Int. Cl.

| | |
|---|---|
| ***B60G 3/10*** | (2006.01) |
| ***B60G 3/20*** | (2006.01) |
| ***B60G 7/00*** | (2006.01) |
| ***B60G 11/04*** | (2006.01) |
| ***B60G 21/055*** | (2006.01) |
| ***B62D 21/11*** | (2006.01) |
| ***B62D 25/20*** | (2006.01) |
| ***B62D 63/02*** | (2006.01) |

(52) U.S. Cl.

CPC .............. *B60G 7/001* (2013.01); *B60G 11/04* (2013.01); *B62D 21/11* (2013.01); *B62D 25/20* (2013.01); *B62D 63/025* (2013.01); *B60G 21/055* (2013.01); *B60G 2200/1324* (2013.01); *B60G 2200/142* (2013.01); *B60G 2200/30* (2013.01); *B60G 2202/112* (2013.01); *B60G 2300/13* (2013.01); *B60G 2300/50* (2013.01)

(58) Field of Classification Search

CPC .......... B60G 3/20; B60G 7/001; B60G 11/04; B60G 21/055; B60G 2200/1324; B60G 2200/142; B60G 2200/30; B60G 2202/112; B60G 2300/13; B60G 2300/50

See application file for complete search history.

(56) References Cited

U.S. PATENT DOCUMENTS 2,085,738 A 7/1937 Coleman
2,138,438 A 11/1938 Wagner
2,344,072 A 3/1944 Winkelmann
RE22,955 E 12/1947 Penney
2,481,943 A 9/1949 Murphy et al.
2,607,301 A 8/1952 Lundvall
2,643,897 A 6/1953 Chowning
2,942,893 A 6/1960 Nallinger
3,237,968 A 3/1966 Arsenault
3,254,734 A 6/1966 Behrmann
3,282,365 A 11/1966 Mcreynolds
3,388,761 A 6/1968 Arpin
3,554,310 A 1/1971 Dieffenbach
3,598,385 A 8/1971 Parsons, Jr.
3,743,047 A 7/1973 Dapolito
3,877,671 A 4/1975 Underwood et al.
4,105,084 A 8/1978 Baak
4,278,143 A 7/1981 Nagai
4,336,964 A 6/1982 Pivar
4,373,743 A 2/1983 Parsons
D269,077 S 5/1983 Horton
4,422,685 A 12/1983 Bonfilio et al.
4,533,013 A 8/1985 Hightower
4,541,654 A 9/1985 Jonasson
4,589,678 A 5/1986 Lund
4,631,891 A 12/1986 Donavich
4,730,870 A 3/1988 De Rees
4,749,211 A 6/1988 Kosuge
4,798,255 A 1/1989 Wu
4,842,326 A 6/1989 Di Vito
4,883,287 A 11/1989 Murakami et al.
4,930,591 A 6/1990 Lanius et al.
4,946,193 A 8/1990 Oka
5,051,046 A 9/1991 Oren
D320,580 S 10/1991 Kim
5,064,209 A 11/1991 Kurschat
5,154,251 A 10/1992 Fought
D345,717 S 4/1994 Molzon et al.
5,401,056 A 3/1995 Eastman
5,498,018 A 3/1996 Wahl et al.
5,538,274 A 7/1996 Schmitz et al.
5,560,651 A 10/1996 Kami et al.
5,568,959 A 10/1996 Weber et al.
5,623,878 A 4/1997 Baxter et al.
5,722,724 A 3/1998 Takei et al.
5,727,642 A 3/1998 Abbott
D395,023 S 6/1998 Hikida
5,820,150 A 10/1998 Archer et al.
5,821,434 A 10/1998 Halliday
5,921,338 A 7/1999 Edmondson
5,934,397 A 8/1999 Schaper
5,961,088 A 10/1999 Chabanne et al.
6,036,201 A 3/2000 Pond et al.
6,050,593 A 4/2000 Mcconnell et al.
6,056,077 A 5/2000 Kobayashi
6,059,058 A 5/2000 Dower
D427,109 S 6/2000 Molzon et al.
6,099,072 A 8/2000 Sturt et al.
6,105,594 A 8/2000 Diaz
6,126,050 A 10/2000 Aliano
6,142,253 A 11/2000 Mueller et al.
6,145,910 A 11/2000 Baldas et al.
6,145,913 A 11/2000 Odagaki
6,189,636 B1 2/2001 Kikukawa
6,223,865 B1 5/2001 Lang et al.
6,238,166 B1 5/2001 Collier
6,257,081 B1 7/2001 Gagnon et al.
6,293,610 B1 9/2001 Howard
6,293,616 B1 9/2001 Williams et al.
6,343,666 B1 2/2002 Olson et al.
6,378,637 B1 4/2002 Ono et al.
6,378,881 B2 4/2002 Stenvall
6,394,555 B2 5/2002 Mizuta et al.
6,457,729 B2 10/2002 Stenvall
6,457,765 B1 10/2002 Bergquist et al.
6,467,783 B1 10/2002 Blondelet et al.
6,557,882 B2 5/2003 Harrington
6,565,105 B2 5/2003 Lin
6,626,260 B2 9/2003 Gagnon et al.
6,631,775 B1 10/2003 Chaney
6,648,105 B2 11/2003 Lang et al.
6,688,616 B1 2/2004 Ziech
6,692,051 B1 2/2004 Cook et al.
6,722,455 B2 4/2004 Hurlburt
6,726,438 B2 4/2004 Chernoff et al.
6,727,962 B2 4/2004 Adams
6,767,022 B1 7/2004 Chevalier
6,796,407 B2 9/2004 Buckley et al.
6,799,781 B2 10/2004 Rasidescu et al.
D498,704 S 11/2004 Bonner et al.
6,830,117 B2 12/2004 Chernoff et al.
6,843,336 B2 1/2005 Chernoff et al.
6,863,288 B2 3/2005 Van Den Brink et al.
6,866,110 B2 3/2005 Mallette et al.
6,880,856 B2 4/2005 Chernoff et al.
6,905,159 B1 6/2005 Saito et al.
6,916,142 B2 7/2005 Hansen et al.
6,923,281 B2 8/2005 Chernoff et al.
6,923,282 B2 8/2005 Chernoff et al.
6,929,083 B2 8/2005 Hurlburt
6,935,658 B2 8/2005 Chernoff et al.
D511,317 S 11/2005 Tanaka et al.
6,959,475 B2 11/2005 Chernoff et al.
6,968,917 B2 11/2005 Rondeau et al.
6,976,307 B2 12/2005 Chernoff et al.
7,000,318 B2 2/2006 Chernoff et al.
7,000,931 B1 2/2006 Chevalier
7,004,484 B1 2/2006 Chevalier
7,025,546 B2 4/2006 Clive-Smith
7,028,799 B2 4/2006 Lin
7,036,848 B2 5/2006 Chernoff et al.
7,044,249 B2 5/2006 Fan
7,048,296 B1 5/2006 Wu
7,059,441 B2 6/2006 Chen
7,070,239 B1 7/2006 Ugrekhelidze et al.
7,083,018 B2 8/2006 Luh
7,083,176 B2 8/2006 Soles et al.
7,100,722 B2 9/2006 Bowen
7,104,581 B2 9/2006 Chernoff et al.

(56) References Cited

U.S. PATENT DOCUMENTS 7,121,623 B2 10/2006 Fujihara et al.
7,153,078 B2 12/2006 Beerhalter et al.
7,159,681 B1 1/2007 Sauve
7,186,065 B2 3/2007 Clive-Smith
7,195,096 B1 3/2007 Mawhinney
7,201,384 B2 4/2007 Chaney
7,213,864 B2 5/2007 Gasper
7,229,117 B2 6/2007 Okuda et al.
7,234,557 B2 6/2007 Chen
7,252,168 B2 8/2007 Lin et al.
7,252,318 B2 8/2007 Sumida et al.
7,258,192 B2 8/2007 Davis et al.
7,258,395 B2 8/2007 Bataille et al.
D552,509 S 10/2007 Walkup et al.
7,287,779 B2 10/2007 Miller
7,287,797 B1 10/2007 Belloso
7,292,992 B2 11/2007 Chernoff et al.
7,303,033 B2 12/2007 Chernoff et al.
7,311,167 B2 12/2007 Takayanagi et al.
7,329,161 B2 2/2008 Roering
7,331,270 B2 2/2008 Booher
7,347,490 B2 3/2008 Kobayashi et al.
7,360,816 B2 4/2008 Chernoff et al.
7,373,315 B2 5/2008 Chernoff et al.
D571,689 S 6/2008 Andrews et al.
7,380,805 B1 6/2008 Turner
7,401,675 B2 7/2008 Chang
7,422,082 B2 9/2008 Reffitt
7,441,809 B1 10/2008 Coombs et al.
7,445,075 B2 11/2008 Ozawa et al.
7,487,985 B1 2/2009 Mighell
D587,913 S 3/2009 Hanson et al.
7,506,714 B2 3/2009 Davis et al.
7,506,718 B2 3/2009 Morita et al.
7,506,855 B2 3/2009 Frantz et al.
7,566,086 B2 7/2009 Gray et al.
7,578,544 B1 8/2009 Shimamura et al.
7,585,010 B2 9/2009 Hardy et al.
7,588,010 B2 9/2009 Mochizuki et al.
7,618,063 B2 11/2009 Takeshima et al.
D605,555 S 12/2009 Tanaka et al.
7,637,338 B2 12/2009 Maltais et al.
7,661,689 B2 2/2010 Kinugasa
7,686,379 B2 3/2010 Lemieux
D613,643 S 4/2010 Zhang
D613,644 S 4/2010 Zhang
7,695,056 B2 4/2010 Hanson et al.
7,712,563 B2 5/2010 Niebuhr
7,717,495 B2 5/2010 Leonard et al.
7,722,063 B2 5/2010 Dieziger
D618,137 S 6/2010 Yuan
7,762,603 B2 7/2010 Hyde
D625,660 S 10/2010 Houston et al.
7,866,422 B2 1/2011 Peters
7,866,428 B1 1/2011 Oliver
7,938,410 B2 5/2011 Buma et al.
D640,597 S 6/2011 Zhang
7,967,100 B2 6/2011 Cover et al.
8,020,658 B2 9/2011 Rajasingham
D646,604 S 10/2011 Zhang
8,029,021 B2 10/2011 Leonard et al.
8,056,928 B2 11/2011 Ijaz et al.
8,079,602 B2 12/2011 Kinsman et al.
D652,349 S 1/2012 Kristensen
8,196,692 B2 6/2012 Davis et al.
8,240,748 B2 8/2012 Chapman
8,256,553 B2 9/2012 De Paschoal
8,286,745 B2 10/2012 Kosco et al.
8,313,136 B2 11/2012 Arnold et al.
8,328,261 B2 12/2012 Kanazawa et al.
8,348,322 B2 1/2013 King
8,356,962 B2 1/2013 Crook
8,381,850 B2 2/2013 Asai et al.
8,387,734 B2 3/2013 Krosschell et al.
8,485,303 B2 7/2013 Yamamoto et al.
8,485,541 B2 7/2013 Pozio
8,544,796 B2 10/2013 Pozzi et al.
8,579,310 B2 11/2013 Tanaka et al.
8,596,652 B2 12/2013 Tong et al.
8,613,335 B2 12/2013 Deckard et al.
8,640,806 B2 2/2014 Worup et al.
8,662,228 B2 3/2014 Hill et al.
RE44,854 E 4/2014 Henderson
8,696,051 B2 4/2014 Charbonneau et al.
8,714,618 B1 5/2014 Heit et al.
8,746,394 B2 6/2014 Kuramoto et al.
8,752,879 B1 6/2014 Heit et al.
8,870,206 B1 10/2014 Bandy
8,876,125 B1 11/2014 Chan
8,911,312 B2 12/2014 Itoo et al.
D721,012 S 1/2015 Zhang
8,925,659 B2 1/2015 Peters
8,944,449 B2 2/2015 Hurd et al.
8,950,530 B2 2/2015 Niedzwiecki
8,973,254 B2 3/2015 Droste
8,973,701 B2 3/2015 Holihan et al.
9,039,060 B1 5/2015 Yamamoto et al.
9,045,028 B2 6/2015 Ichikawa
9,102,205 B2 8/2015 Kvien et al.
9,114,682 B1 8/2015 Bandy
9,127,738 B2 9/2015 Ellifson et al.
9,187,023 B2 11/2015 Takahashi et al.
9,242,581 B2 1/2016 Farooq et al.
D748,549 S 2/2016 Battams
9,327,621 B2 5/2016 Oshima
9,381,940 B2 7/2016 Gale
9,393,894 B2 7/2016 Steinmetz et al.
9,394,014 B2 7/2016 Girouard et al.
D766,130 S 9/2016 Baron
9,434,412 B2 9/2016 Clark et al.
9,440,681 B2 * 9/2016 Kuroda ................ B62D 23/005
9,440,690 B2 9/2016 Manternach et al.
9,481,265 B2 11/2016 Moore et al.
9,505,283 B2 11/2016 Kuwabara et al.
9,555,701 B2 1/2017 Borowicz et al.
9,555,702 B2 1/2017 Olli
9,561,143 B2 2/2017 Hoffmann
9,637,026 B2 5/2017 Cardone et al.
9,637,190 B2 5/2017 Pojidaev
9,643,527 B2 5/2017 Uranaka et al.
9,649,924 B2 5/2017 Nakaoka et al.
9,669,873 B2 6/2017 Buschjohann et al.
D791,032 S 7/2017 Henstridge
9,694,676 B2 7/2017 Bandy
9,713,976 B2 7/2017 Miller et al.
9,719,591 B2 8/2017 Wade et al.
9,758,030 B2 9/2017 Newman
9,764,639 B2 9/2017 Park et al.
9,771,112 B2 9/2017 Spindler et al.
9,845,004 B2 12/2017 Hedlund et al.
9,845,123 B2 12/2017 Byrnes et al.
9,863,523 B2 1/2018 Stocks et al.
9,889,777 B2 2/2018 Proulx et al.
9,981,590 B2 5/2018 Scheer
10,017,037 B2 7/2018 Newman et al.
10,040,501 B2 8/2018 Haines
10,066,728 B2 9/2018 Yolitz
10,081,290 B2 9/2018 Fohrenkamm et al.
10,086,891 B2 10/2018 Hung et al.
10,124,655 B2 11/2018 Langevin
10,131,381 B2 11/2018 Ashraf et al.
10,155,442 B2 12/2018 Gong et al.
10,160,498 B1 12/2018 Ezra
10,207,554 B2 2/2019 Schroeder et al.
10,207,555 B2 2/2019 Mailhot et al.
10,232,882 B2 3/2019 Bertezzolo
10,239,562 B2 3/2019 Kotrla
10,266,052 B2 4/2019 Vermeersch et al.
10,272,759 B2 4/2019 Sudhindra et al.
10,442,264 B2 10/2019 Mailhot et al.
10,545,509 B1 1/2020 Jessen et al.
10,562,409 B2 2/2020 Kadiu et al.
10,569,663 B2 2/2020 Webb
10,583,818 B2 3/2020 Chang et al.

(56) References Cited

U.S. PATENT DOCUMENTS 10,625,867 B2 4/2020 Hildom et al.
10,632,857 B2 4/2020 Matecki et al.
10,632,951 B2 4/2020 Nusier et al.
10,633,028 B2 4/2020 Winter
D892,676 S 8/2020 Hu et al.
10,766,533 B2 9/2020 Houkom et al.
10,946,707 B2 3/2021 Hisamura et al.
11,088,412 B2 8/2021 Matecki et al.
11,121,427 B1 9/2021 Bustamante Laparra
11,148,517 B2 10/2021 Hammond et al.
11,155,150 B2 10/2021 Stephens et al.
11,211,656 B2 12/2021 Matecki et al.
11,331,994 B2 5/2022 Handing et al.
11,583,739 B2 2/2023 Morgan
11,586,222 B2 2/2023 Georgeson et al.
11,618,292 B2 4/2023 Haeusler et al.
11,767,060 B2 9/2023 Hammond et al.
D1,002,433 S 10/2023 Li et al.
11,845,374 B2 12/2023 Moarefi et al.
D1,015,940 S 2/2024 Xu et al.
D1,036,300 S 7/2024 Dong
12,077,211 B2 * 9/2024 Hammond, Jr. ....... B62D 21/11
12,077,212 B2 * 9/2024 Hammond, Jr. ....... B62D 21/02
12,077,213 B2 * 9/2024 Hammond, Jr. ....... B62D 21/02
12,116,038 B2 10/2024 Hammond et al.
12,122,452 B2 10/2024 Hammond et al.
D1,049,924 S 11/2024 Xie et al.
D1,049,925 S 11/2024 Xie et al.
D1,064,917 S 3/2025 Thurumalla et al.
12,269,331 B2 4/2025 Gouldie et al.
D1,080,458 S 6/2025 Fang et al.
D1,096,512 S 10/2025 Lin et al.
D1,100,742 S 11/2025 Lin et al.
2001/0024046 A1 9/2001 Mizuta
2002/0175007 A1 11/2002 Strong
2003/0019684 A1 1/2003 Wucherpfennig et al.
2003/0046802 A1 3/2003 Chernoff et al.
2003/0085064 A1 5/2003 Turner
2003/0192726 A1 10/2003 Chu et al.
2004/0021286 A1 2/2004 Bombardier et al.
2004/0026146 A1 2/2004 Mallette et al.
2004/0031639 A1 2/2004 Deves et al.
2004/0178600 A1 9/2004 Wagner
2004/0206568 A1 10/2004 Davis et al.
2004/0227321 A1 11/2004 Kuroki et al.
2005/0012353 A1 1/2005 Winter
2005/0017469 A1 1/2005 Hill et al.
2005/0072613 A1 4/2005 Maltais et al.
2005/0077098 A1 4/2005 Takayanagi et al.
2005/0140160 A1 6/2005 Arias
2005/0179242 A1 8/2005 Chernoff et al.
2005/0279541 A1 12/2005 Peters
2006/0032692 A1 2/2006 Ma et al.
2006/0086553 A1 4/2006 Chen
2006/0103126 A1 5/2006 Miller
2006/0169549 A1 8/2006 Ang et al.
2006/0180383 A1 8/2006 Bataille et al.
2006/0283645 A1 12/2006 Lin et al.
2007/0057526 A1 3/2007 Bigelow et al.
2007/0089929 A1 4/2007 Schriewer
2007/0090621 A1 4/2007 Vigen
2007/0108712 A1 5/2007 Ryan
2007/0152463 A1 7/2007 Hardy et al.
2007/0219030 A1 9/2007 Ho
2008/0006459 A1 1/2008 Niebuhr
2008/0017426 A1 1/2008 Walters et al.
2008/0100018 A1 5/2008 Dieziger
2009/0008890 A1 1/2009 Woodford
2009/0194961 A1 8/2009 Dieziger
2010/0133019 A1 6/2010 Muemken
2010/0263948 A1 10/2010 Couture et al.
2012/0193163 A1 8/2012 Wimpfheimer et al.
2012/0217715 A1 8/2012 Ehrlich et al.
2013/0038082 A1 2/2013 Bertocchi
2013/0206496 A1 8/2013 Hashimoto
2013/0241228 A1 9/2013 Nakamura et al.
2013/0270864 A1 10/2013 Young et al.
2014/0292039 A1 10/2014 Kuroda et al.
2014/0332298 A1 11/2014 Girouard et al.
2015/0268010 A1 9/2015 Strauss
2016/0207418 A1 7/2016 Bergstrom et al.
2017/0088231 A1 3/2017 Williams et al.
2017/0341590 A1 11/2017 Mclauchlan
2017/0355295 A1 12/2017 Gutowitz
2018/0126871 A1 5/2018 Martinotti et al.
2018/0170218 A1 6/2018 Nowland
2018/0186355 A1 7/2018 Harvey et al.
2018/0326843 A1 11/2018 Danielson et al.
2018/0354375 A1 12/2018 Dao et al.
2019/0126992 A1 5/2019 Nagai et al.
2019/0143808 A1 5/2019 Oba et al.
2019/0241037 A1 8/2019 Hays et al.
2020/0155386 A1 5/2020 Kumar
2020/0324637 A1 10/2020 Hammond et al.
2021/0179189 A1 6/2021 Noh et al.
2021/0331613 A1 10/2021 Tignanelli
2024/0425112 A1 12/2024 Hammond et al.
2024/0425113 A1 12/2024 Hammond et al.
2025/0229657 A1 7/2025 Hidaka et al.
2026/0070528 A1 3/2026 Theodosakis et al.
2026/0103056 A1 4/2026 Kemp et al.

FOREIGN PATENT DOCUMENTS

CN 204309899 U 5/2015
CN 204956652 U 1/2016
CN 207000185 U 2/2018
CN 207000216 U 2/2018
CN 207000277 U 2/2018
CN 207029307 U 2/2018
CN 207257319 U 4/2018
CN 207257349 U 4/2018
CN 207257350 U 4/2018
CN 207360149 U 5/2018
DE 10154353 A1 * 5/2002 .............. B60L 11/14
EP 618128 A1 * 10/1994 ............... B60K 1/00
EP 0 618 128 B1 8/1997
JP 2000-051419 A 2/2000
JP 2000-070424 A 3/2000
JP 2000-118274 A 4/2000
JP 2000-126345 A 5/2000
JP 2000-185125 A 7/2000
JP 2000-185126 A 7/2000
JP 2000-185127 A 7/2000
JP 2000-185585 A 7/2000
JP 3870586 B2 7/2000
JP 2000-302060 A 10/2000
JP 2001-224722 A 8/2001
JP 2001-224723 A 8/2001
JP 3988361 B2 1/2002
JP 2004-008640 A 1/2004
JP 2006-204331 A 8/2006
JP 2011-051365 A 3/2011
KR 3010531380000 4/2020
WO WO-02/49905 A1 6/2002
WO WO-2012/117204 A1 9/2012

OTHER PUBLICATIONS

Cushman Shuttle 6 Elite by CartBarn, dated 2024, found online [May 15, 2025] https://www.cartbarn.com/New-Inventory-2024-Cushman-Golf-Cart-Shuttle-6-ELITE-Lithium-Electric-CartBarn-14826701.

2018 Enhance Your Lifstyle EZGO Express video; https://www.youtube.com/watch?v=xDRgDe3EtlE; last accessed Feb. 20, 2026.

2018 Evolution 4 Passenger Seat Utility Golf Cart [mint condition] for sale; https://golf-carts-forsale.com/2018-evolution-4-passenger-seat-utility-golf-cart-mint-condition/; accessed Feb. 20, 2026.

About HDK Electric Vehicle https://www.youtube.com/watch?v=4NxJJ2dyf9c; last accessed Feb. 24, 2026.

(56) References Cited

OTHER PUBLICATIONS

Black Out Package on a Low Speed Vehicle by Bintelli Electric Vehicles; https://www.youtube.com/watch?v=Yp3Cb3DjQXA; last accessed Feb. 20, 2026.
Bubble Parts Manual https://www.motoelectricvehicles.com/media/post/Bubble%20Parts%20Manual.pdf; accessed Feb. 18, 2026.
E-Z-GO Releases Two New 72v Vehicles to Their Express Series; https://golfcartresource.com/e-z-go-releases-two-new-72v-vehicles-to-their-express-series/; May 18, 2018.
Electric Powered Vehicle Service Parts Manual 625482-AV, E-Z-GO, A Textron Company. Issued Sep. 2011, revised Dec. 2018.
Evolution Revolution 4 Jul. 7, 2016 PGA Show https://golfcaradvisor.com/2016/07/07/evolution-electric-vehicles-chino-california/.
Ford Motor Company Owner Manual, Ford Motor Company, Copyright 2002 https://www.ford.com/support/owner-manuals-details/th-nk-neighbor/2002/?srsltid=AfmBOoqD6aEDPHhI57v2GC1NpzAS1mrvM_hGNXcZhR9voiE2HfsiGPId.
Ford Think EV Rebuild—Part 3: Bare Frame & Stark Varg Power Unboxing; https://www.youtube.com/watch?v=m2fsoSrSd68; last accessed Feb. 20, 2026.
Ford Think Ground Up Conversion; Jan. 24, 2016; https://www.diyelectriccar.com/threads/ford-think-ground-up-conversion.168530/.
Ford Think Rebuild—Part 2: First Look Under the Body—Tearing Down the Front End; https://www.youtube.com/watch?v=2GPP4xuL-Ak; last accessed Feb. 20, 2026.
MotoEV Electro Bubble Buddy LSV 4 Passenger LE; https://www.motoelectricvehicles.com/vehicles/vehicles_detail/motoev_4_passenger_le_bubble_buddy/ accessed Feb. 20, 2026.
Karo et al., "High-powered battery-powered riding cart Development of Carry ECO5-II", Shin-Kobe Technical Report No. 18 (Feb. 2008), n.d., (Machine Translation 6 pages).
Multi-Passenger Kit Product represented by "Multi-Passenger Kits", retrieved from https://pubhtml5.com/lxea/axol/M%26M_Vehicles_2018_Catalog/59 Jul. 15, 2026, n.d., (1 page).
Sanada et al., "New battery-powered ride-on cart Carry ECO5-Z", Shin-Kobe Technical Report No. 20 (Feb. 2010), n.d., (Machine Translation 8 pages).
Unknown, "2008 Villager 6 and 8 Illustrated Parts List", parts list, retrieved May 6, 2026 from https://www.cartpros.com/Wp-content/uploads/2021/02/IPL_08_Villager_6_8.pdf, dated Aug. 6, 2007.
Unknown, "2016 Precedent Illustrated Parts List", retrieved from https://mobilicab.com/F4hxm7zhX073ecq/2016_precedent.pdf?srsltid=AfmBOop3_G4Eyzw0J5Ejly8u7k5yxQ2xjkun61UgN9zvYD4xViO2pzft on Jul. 15, 2026, dated 2026 (298 pages).
Unknown, "2018 Precedent Illustrated Parts List", retrieved from https://prestigegolfcars.com/wp-content/uploads/2021/09/2018-Precedent-ERIC-And-EX-40-EFI-Illustrated-Parts-Catalog.pdf on Jul. 15, 2026, dated 2018, (312 pages).
Unknown, "Calling all beach bums! It's time for you to step up your game With an E-Z-Go L6. . . " Instagram post, retrieved May 7, 2026 from https://www.instagram.com/p/Bvg160rFno4 , dated Mar. 27, 2019.
Unknown, "ECO5-Z(HIC-870)", product page, retrieved from https://www.nf-corporation.com/archives/maker/4717/ on Jul. 15, 2026, n.d. (1 page).
Unknown, "EZGO Golf Cart," vector template, retrieved May 6, 2026 from https://web.archive.org/web/20250812032812/https://WWW.vector-templates.com/templates/show/ezgo_golf_cart/7229/, dated Oct. 12, 2025.
Unknown, "New Design Electric Antique Car Horseless Carriage", retrieved from https://www.alibaba.com/product-detail/New-Design-Electric-Antique-Car-Horseless_60813436801.html on Jul. 15, 2026, n.d., (1 page).
Unknown, "No. Reserve 2025 Yatian LY05B Electric Classic Car", retrieved from https://bringatrailer.com/listing/2024-yatian-Iz5b/ on Jul. 15, 2026, n.d., (1 page).
Unknown, "Owners Instruction Manual Fits 2012-2018 E-Z-Go 48V Electric Express L6 S6 L4 Op", Manual, retrieved May 7, 2026 from https://www.ebay.com/itm/394579492999 , dated Jul. 31, 2018.
Unknown, "Say Hello to the Envy of the Neighborhood: Meet the All-New E-Z-Go Liberty," product page, retrieved May 6, 2026 from https://ezgo.txtsv.com/2027-liberty , date unknown.
Unknown, "Vintage Elegance", retrieved from https://www.gdyatian.com/Amusement-Park-Customized-Black-Vintage-Car-pd46557399.html Jul. 15, 2026, n.d. (1 page).
Yoshioka et al., "Model Change of the Electromagnetic Induction Type Riding Golf Cart Carry-ECO5", Shin-Kobe Technical Report No. 16 (Feb. 2006), n.d., (Machine Translation 6 pages).

* cited by examiner

16

16

16

22
16
30
14
38
26
18
DE
38
22
30
Y 22
16
30
38
14
26
18
DE 38
22
30
Y
22
16
30
14
38
26
18
DE
38
22
30
Y 22
16
30
14
26
42
18
DE
22
30
Y 22
16
30
14
26
42
18
DE 22
30
Y
22
16
30
14
26
42
18
DE
22
30
Y 34
16
54
54
54
54

LIGHTWEIGHT VEHICLE

CROSS-REFERENCE TO RELATED APPLICATIONS

This application is a continuation of U.S. patent application Ser. No. 18/337,896, filed Jun. 20, 2023, which is a continuation of U.S. patent application Ser. No. 16/383,041, filed Apr. 12, 2019, both of which are incorporated herein by reference in their entireties.

This application is related in general subject matter to U.S. patent application Ser. No. 16/383,073, filed Apr. 12, 2019 by the Applicant of the present application. Said application is assigned to the same assignee as the present application, was filed concurrently with said application, and is hereby incorporated by reference in its entirety into the present application.

FIELD

The present teachings relate to lightweight vehicles, and to a universal assembly platform that can be selectively outfitted to construct a variety of different lightweight vehicles.

BACKGROUND

The statements in this section merely provide background information related to the present disclosure and may not constitute prior art.

Lightweight vehicles are quite capable in a wide variety of riding environments and situations, whether for sport or utility purposes. The ability of the vehicles to carry multiple occupants makes them socially enjoyable to ride as well. The vehicles can be easy to enter and exit and easy to operate with controls and ergonomics somewhat similar to automobiles. While lightweight vehicles commonly have seating for multiple passengers, it may be desirable to improve the seating layout from known vehicles.

SUMMARY

In various embodiments, the present disclosure provides a universal assembly platform for lightweight vehicles, wherein the platform comprises a main vehicle chassis structure, a front suspension system connected to the main vehicle chassis structure and to which one or more front wheel assembly is mountable, and a rear suspension system connected to the main vehicle chassis structure and to which one or more rear wheel assembly is mountable. The front and rear suspension systems are connected to the main vehicle chassis structure such that when the one or more wheel assembly is mounted to the front and/or rear suspension system, the front distal end of the front tire is longitudinally forward of the universal assembly platform and the rear distal end of the rear tire is longitudinally rearward of the universal assembly platform. In various instances a rear wheel of the one or more rear wheel assembly defines the distal end of an overall length of the vehicle.

In various embodiments, the present disclosure provides a lightweight vehicle that comprises a universal assembly platform for lightweight vehicles, wherein the platform comprises a main vehicle chassis structure, a front suspension system connected to the main vehicle chassis structure and to which one or more front wheel assembly is mountable, and a rear suspension system connected to the main vehicle chassis structure and to which one or more rear wheel assembly is mountable. The front and rear suspension system are connected to the main vehicle chassis structure such that when the one or more wheel assembly is mounted to the front and/or rear suspension system the front distal end of the front tire is longitudinally forward of the universal assembly platform and the rear distal end of the rear tire is longitudinally rearward of the universal assembly platform. In various instances a rear wheel of the one or more rear wheel assembly defines the distal end of an overall length of the vehicle. The vehicle further comprises one or more forward facing seating structure. In various embodiments, the rearmost forward facing structure is connected to the universal assembly platform such that it is positioned over the rear suspension.

In various embodiments, the present disclosure provides a lightweight vehicle that comprises a universal assembly platform for lightweight vehicles, wherein the platform comprises a main vehicle chassis structure, a front suspension system connected to the main vehicle chassis structure and to which one or more front wheel assembly is mountable, and a rear suspension system connected to the main vehicle chassis structure and to which one or more rear wheel assembly is mountable. The front and rear suspension system are connected to the main vehicle chassis structure such that when the one or more rear wheel assembly is mounted to the front and/or rear suspension system the front distal end of the front tire is forward of the universal assembly platform and the rear distal end of the rear tire is rearward of the universal assembly platform. In various instances a rear wheel of the one or more rear wheel assembly defines the distal end of an overall length of the vehicle. The lightweight vehicle further comprises a prime vehicle mover operably connected to one or more wheel assemblies for moving the vehicle over ground. In various embodiments, the lightweight vehicle additionally comprises a front row forward facing seating structure, and a rear row forward facing seating structure that is disposed directly above the rear suspension system.

This summary is provided merely for purposes of summarizing various example embodiments of the present disclosure so as to provide a basic understanding of various aspects of the teachings herein. Various embodiments, aspects, and advantages will become apparent from the following detailed description taken in conjunction with the accompanying drawings which illustrate, by way of example, the principles of the described embodiments. Accordingly, it should be understood that the description and specific examples set forth herein are intended for purposes of illustration only and are not intended to limit the scope of the present teachings.

DRAWINGS

The drawings described herein are for illustration purposes only and are not intended to limit the scope of the present teachings in any way.

Figures 3A, 3B, 3C:
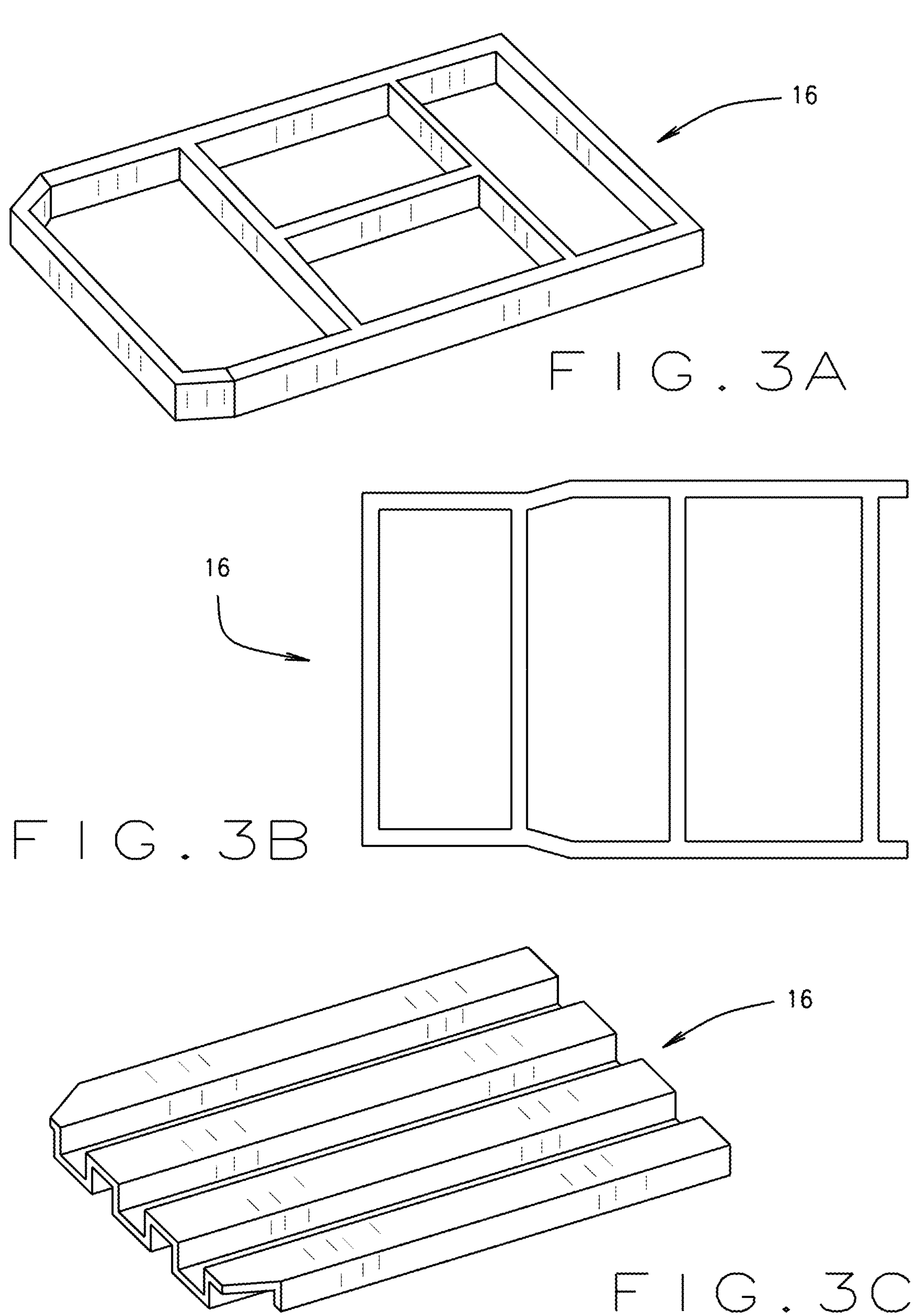
FIGS. 3A through 3C are illustrations of exemplary chassis that can be utilized as a chassis for the universal assembly platform shown in FIGS. 1A, 1B and 2, in accordance with various embodiments of the present disclosure.
Figures 4A, 4B, 4C:
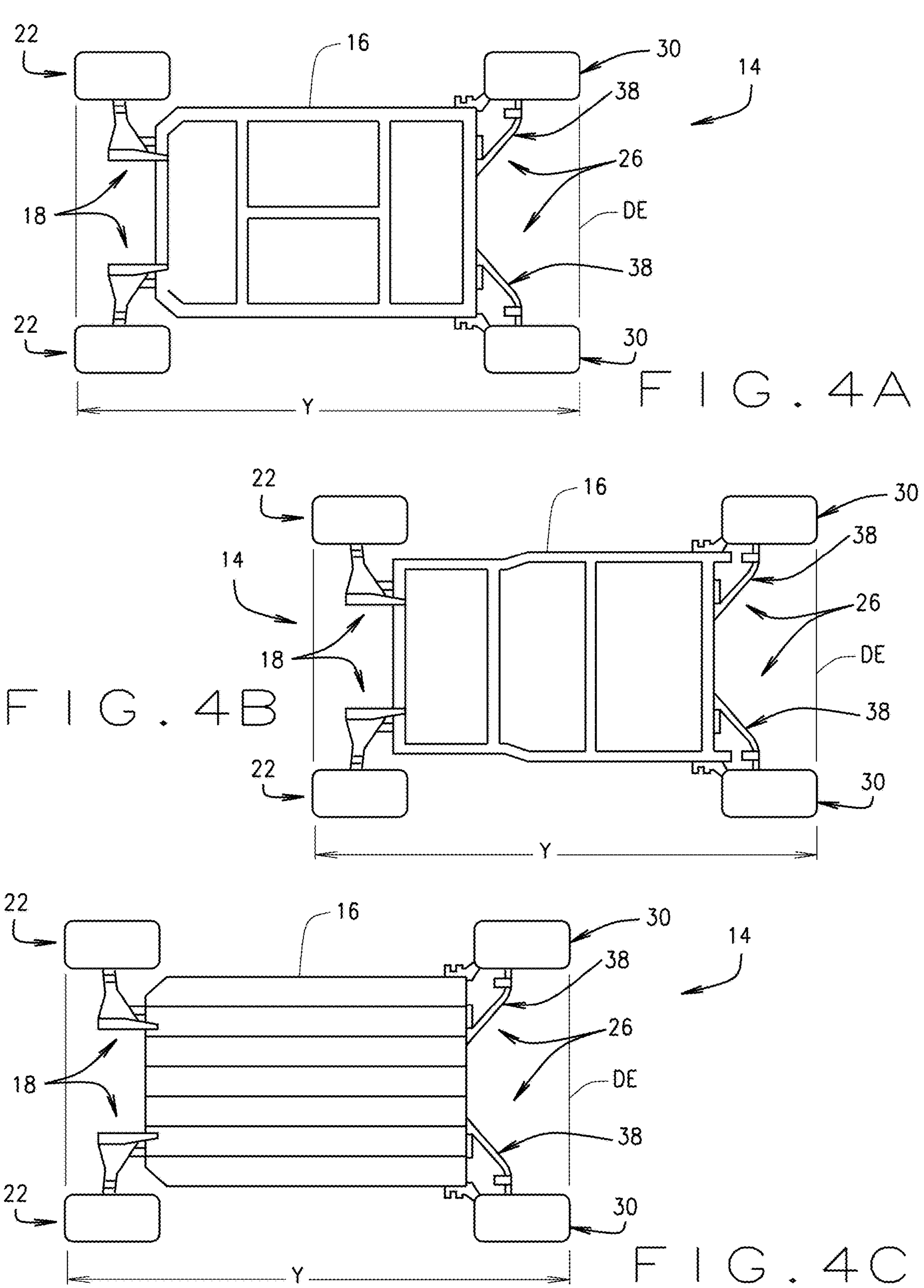

FIGS. 4A through 4C are illustrations of exemplary universal assembly platforms that comprise the exemplary chassis shown in FIGS. 3A through 3C and includes a rear suspension system comprising a pair independent rear suspension assemblies having rear wheel assemblies mounted thereto, and also includes a front suspension system comprising a pair independent front suspension assemblies having front wheel assemblies mounted thereto, in accordance with various embodiments of the present disclosure.

Figures 5A, 5B, 5C:
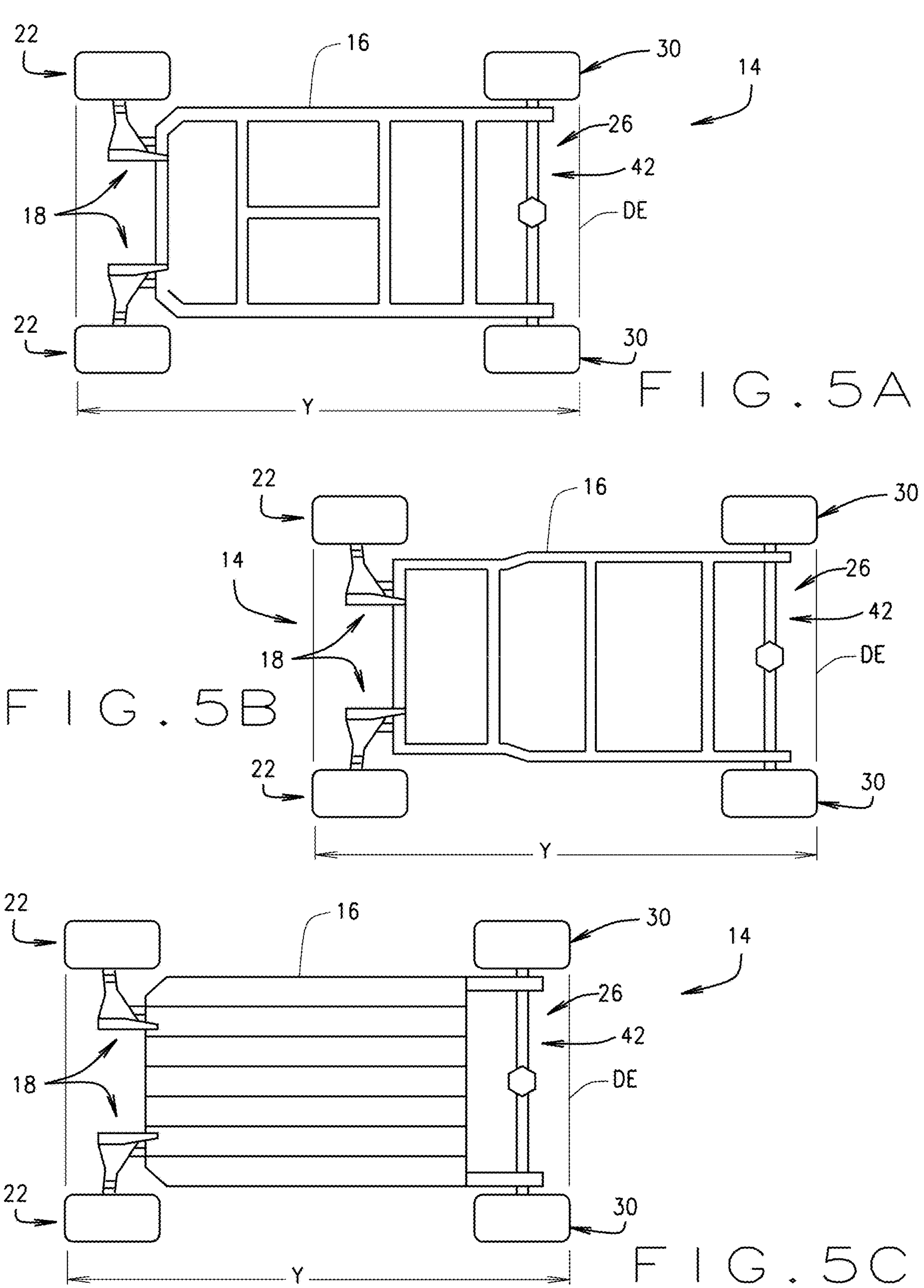

FIGS. 5A through 5C are illustrations of exemplary universal assembly platforms that comprise the exemplary chassis shown in FIGS. 3A through 3C and includes a rear suspension system comprising a solid axle rear suspension assembly having rear wheel assemblies mounted thereto, and also includes a front suspension system comprising a pair independent front suspension assemblies having front wheel assemblies mounted thereto, in accordance with various embodiments of the present disclosure.

FIGS. 6A through 6D are illustrations of various exemplary vehicles constructed using the universal assembly platforms shown in FIGS. 5A through 5C, in accordance with various embodiments of the present disclosure.

FIGS. 7A through 7E are illustrations of various exemplary vehicles constructed using the universal assembly platforms shown in FIGS. 4A through 4C, in accordance with various embodiments of the present disclosure.

Figure 6A:
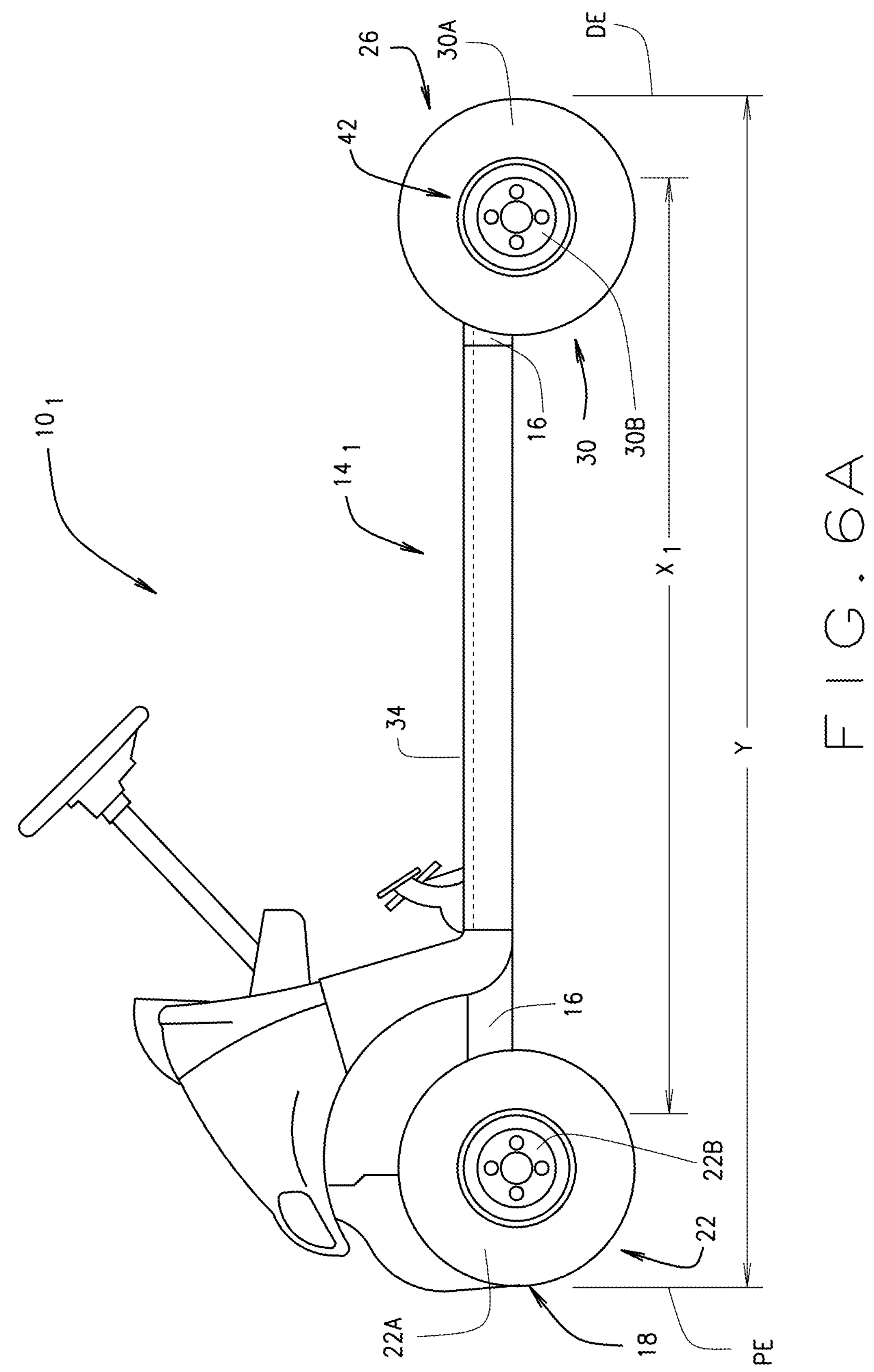
Figure 6B:
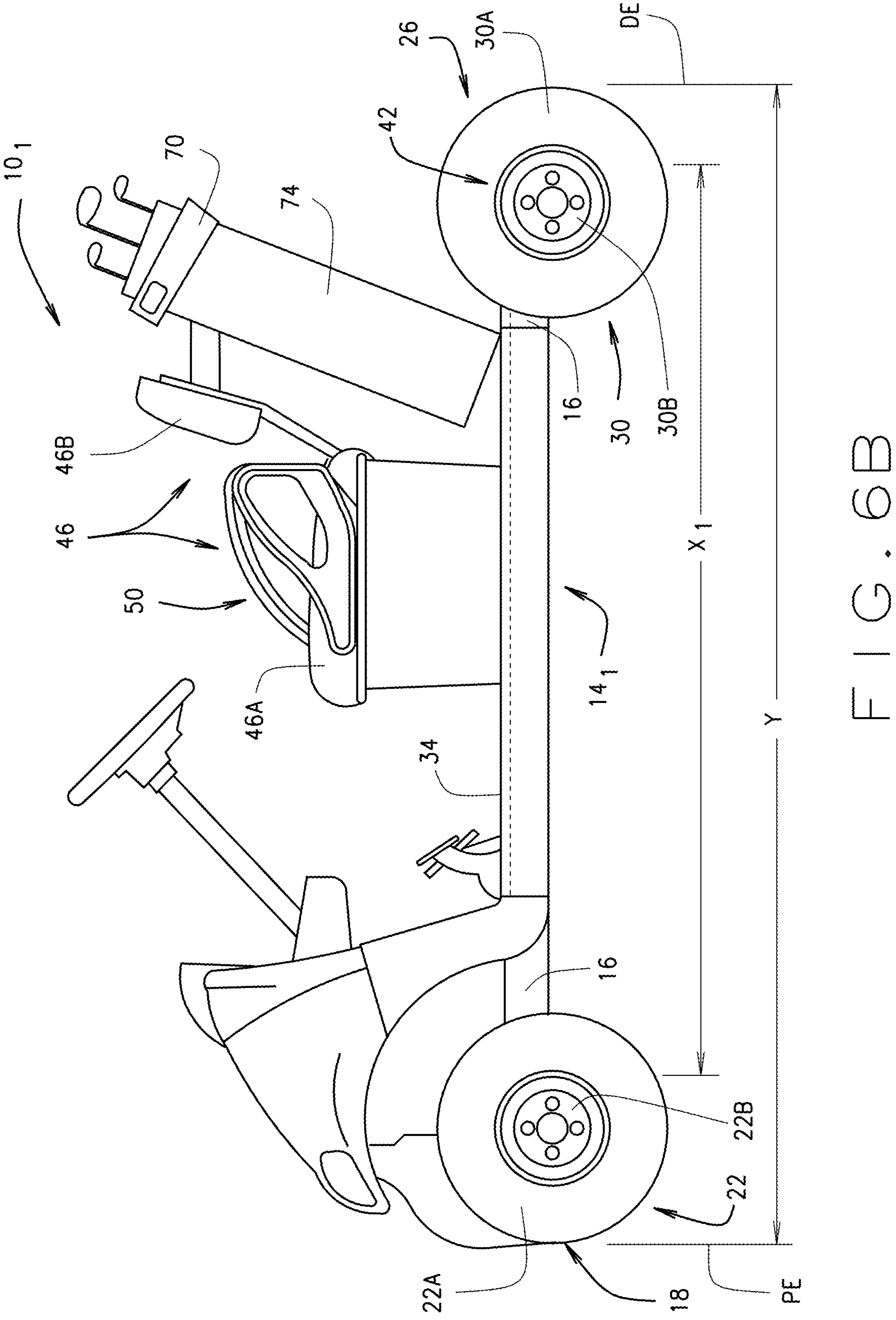
Figure 6C:
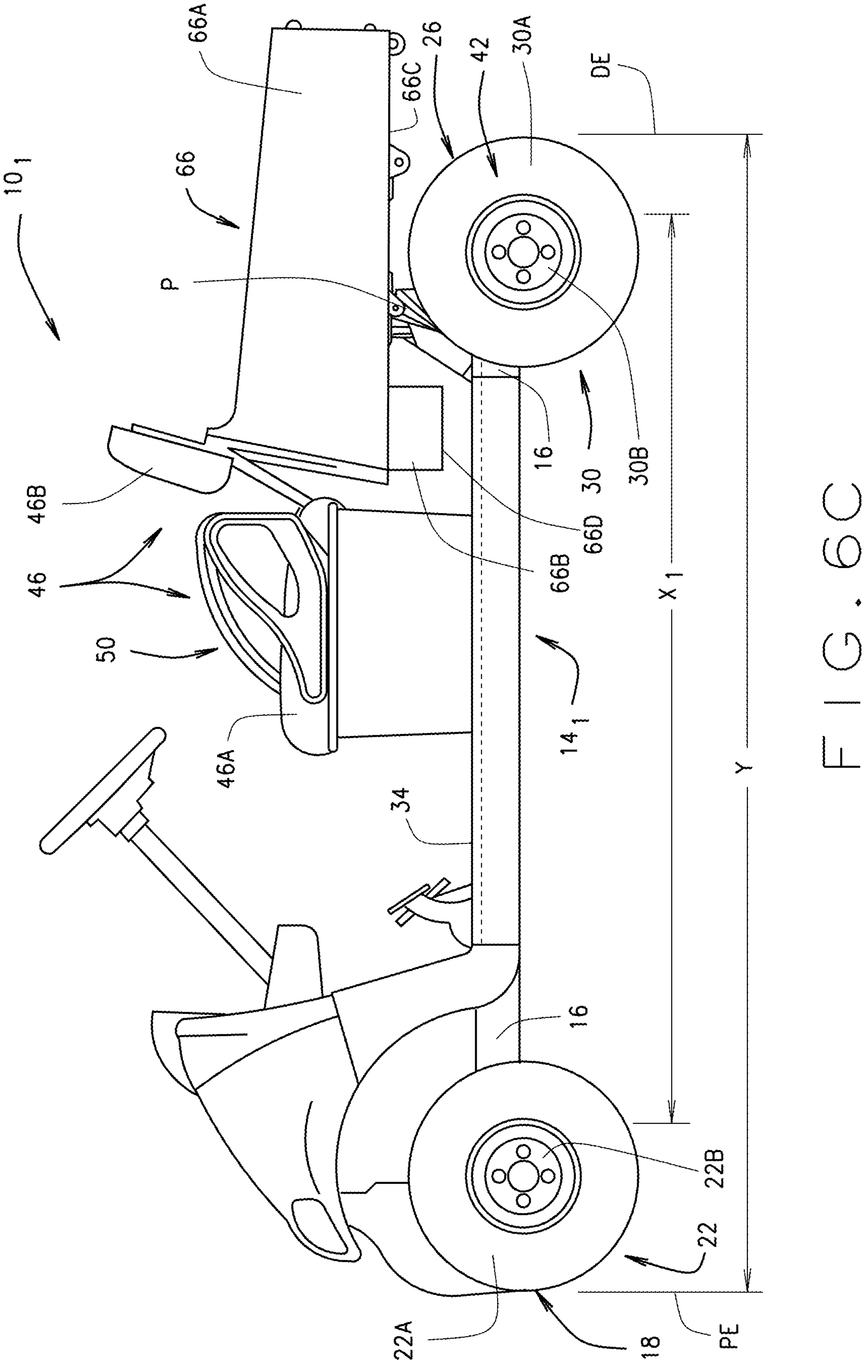
Figure 6D:
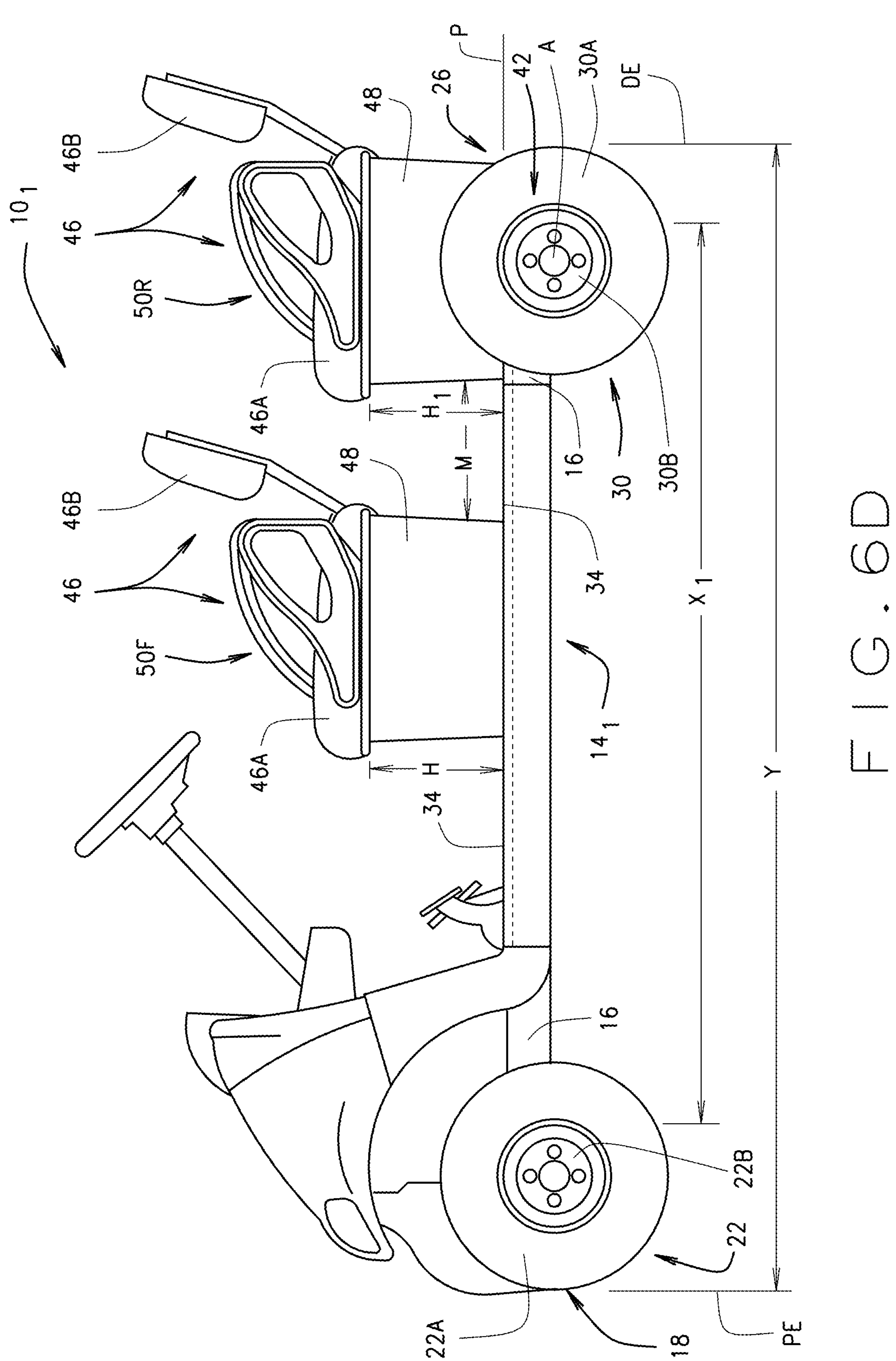
Figure 7A:
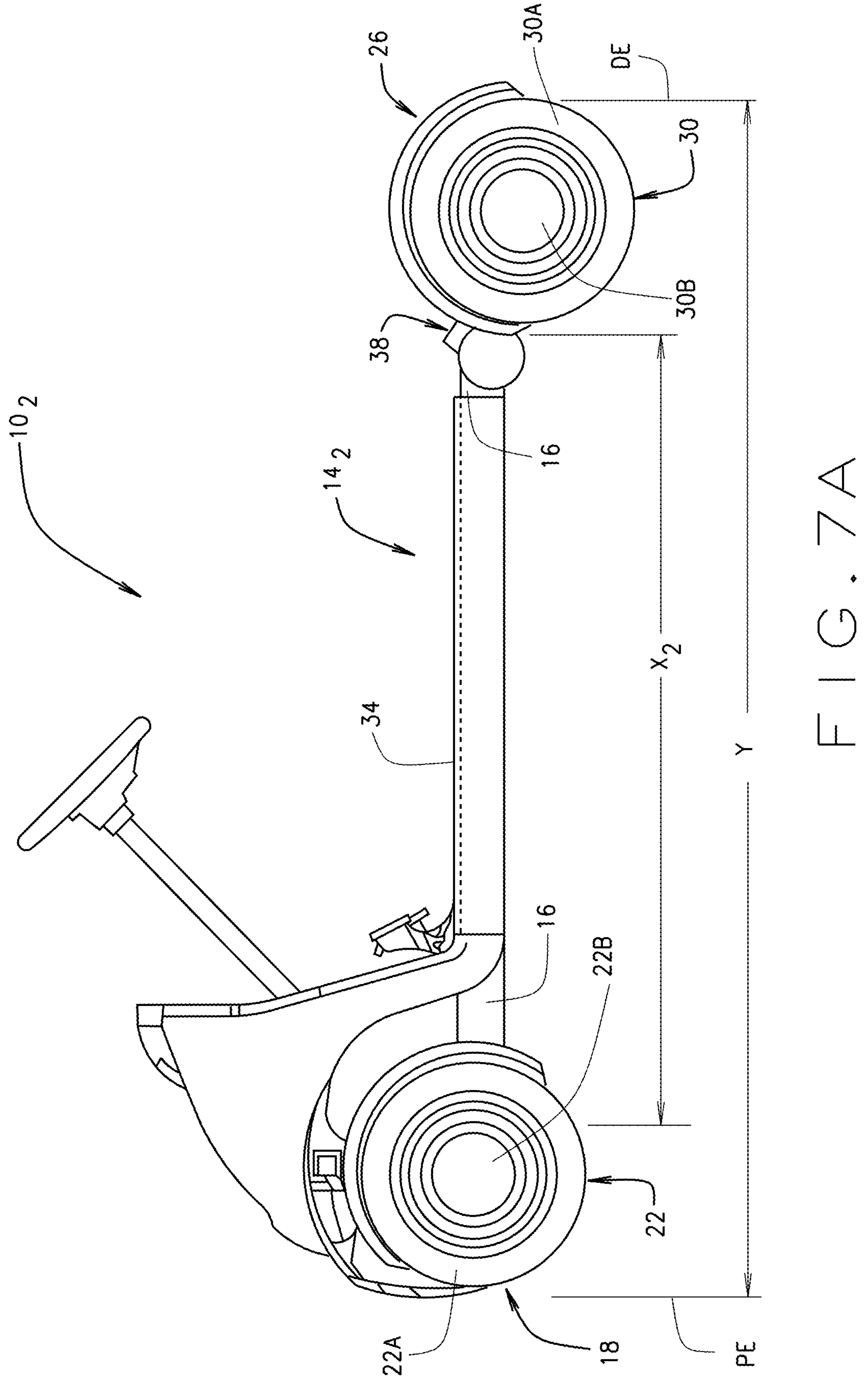
Figure 7B:
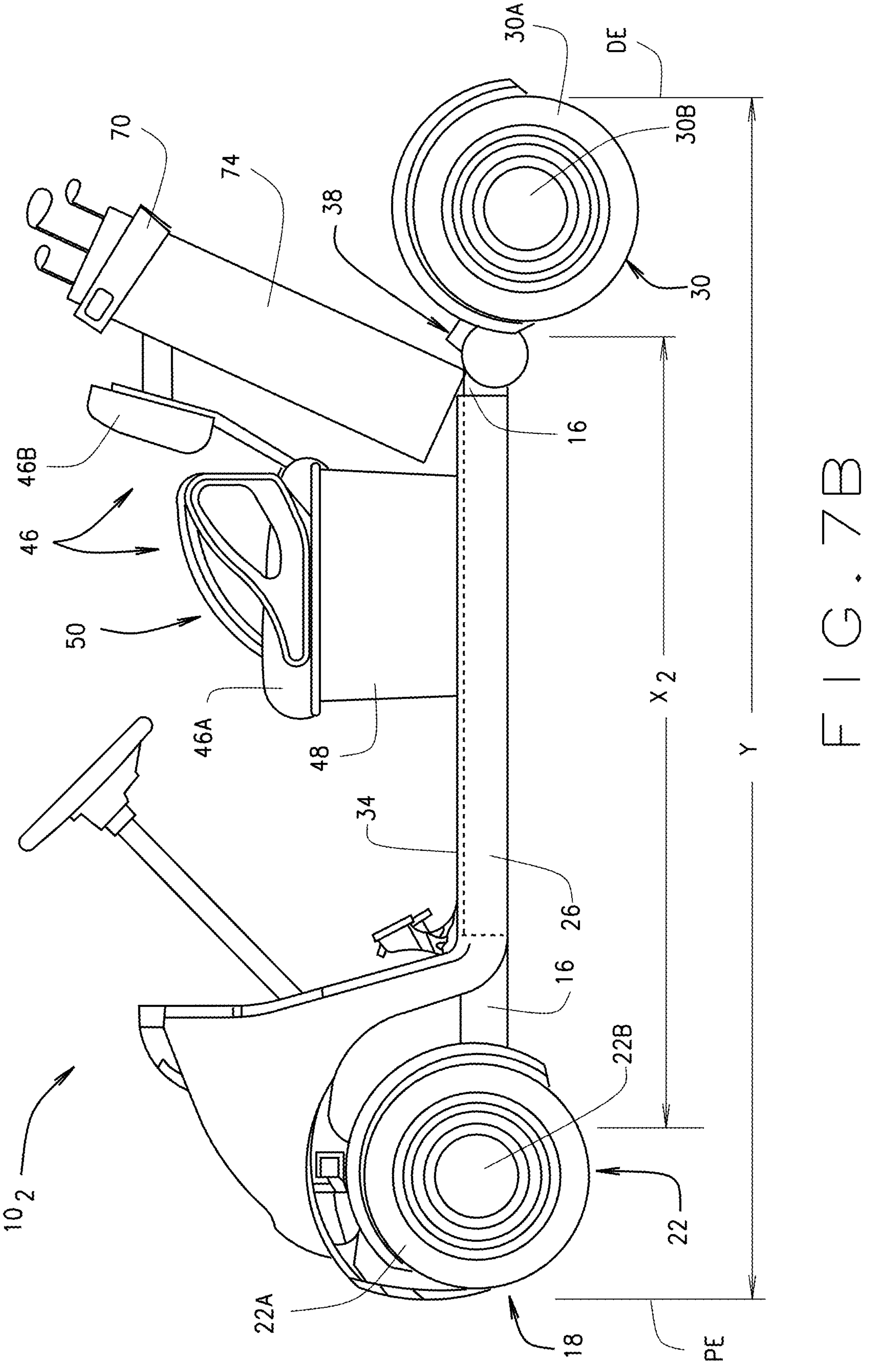
Figure 7C:
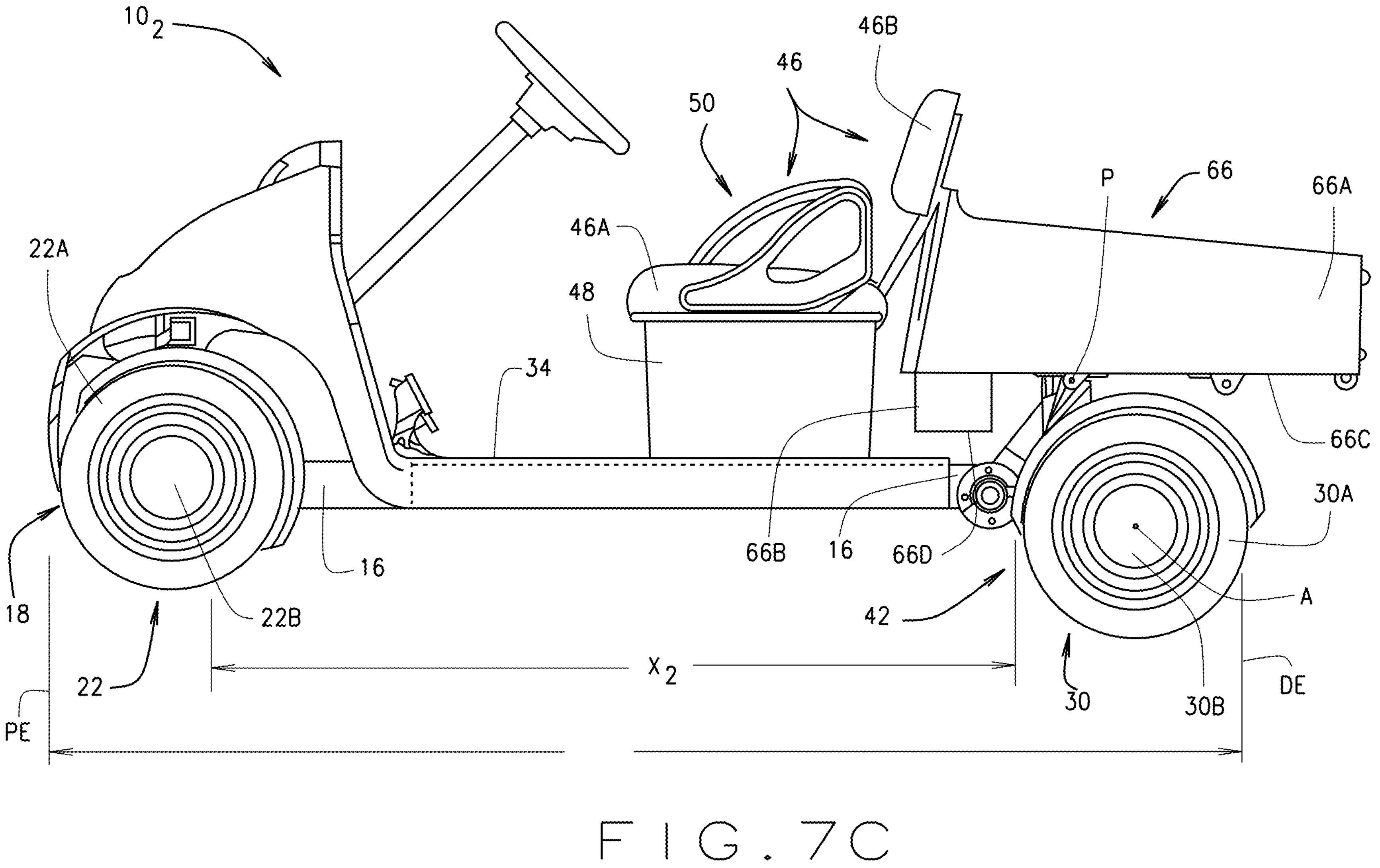
Figure 7D:
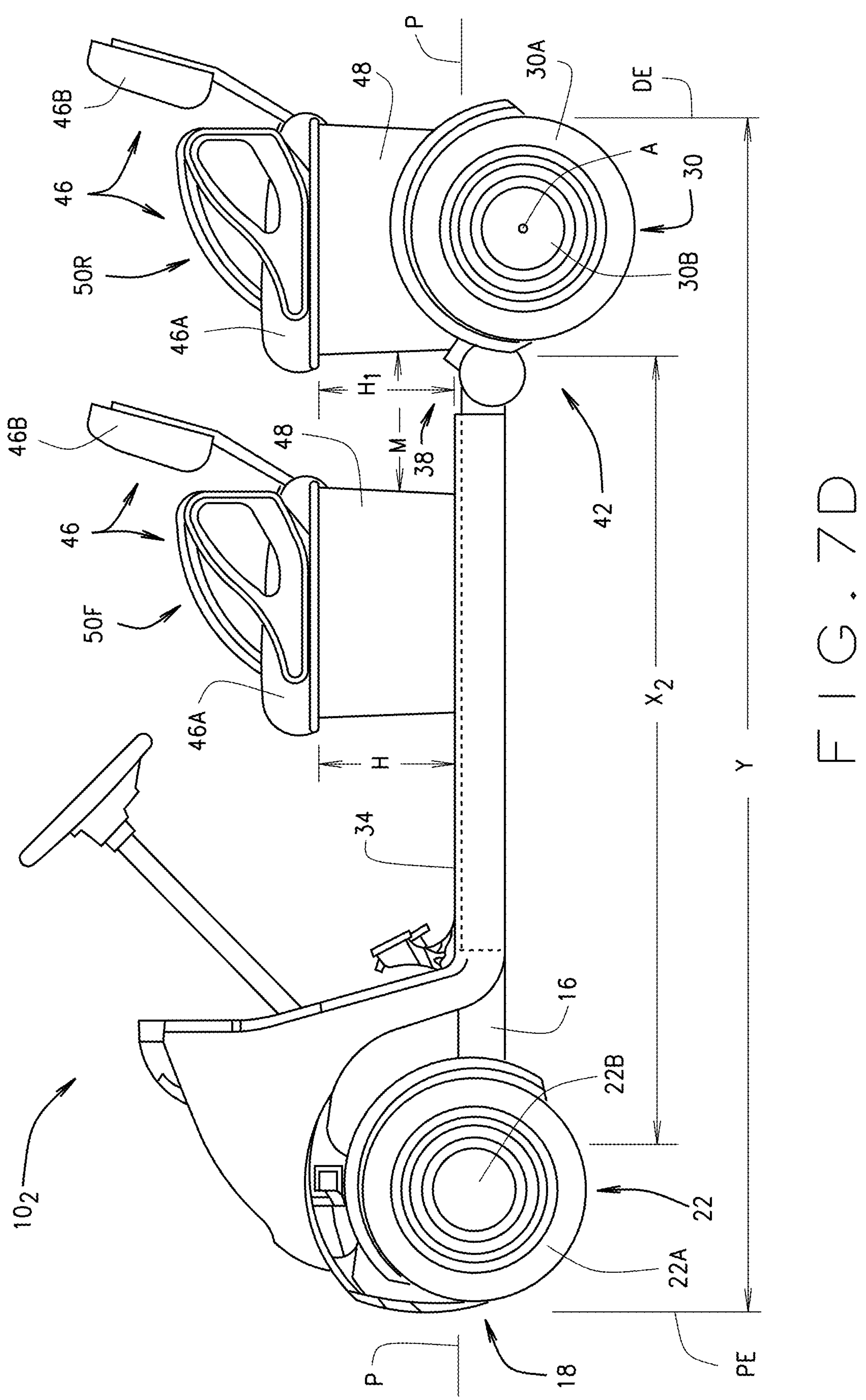
Figure 7E:
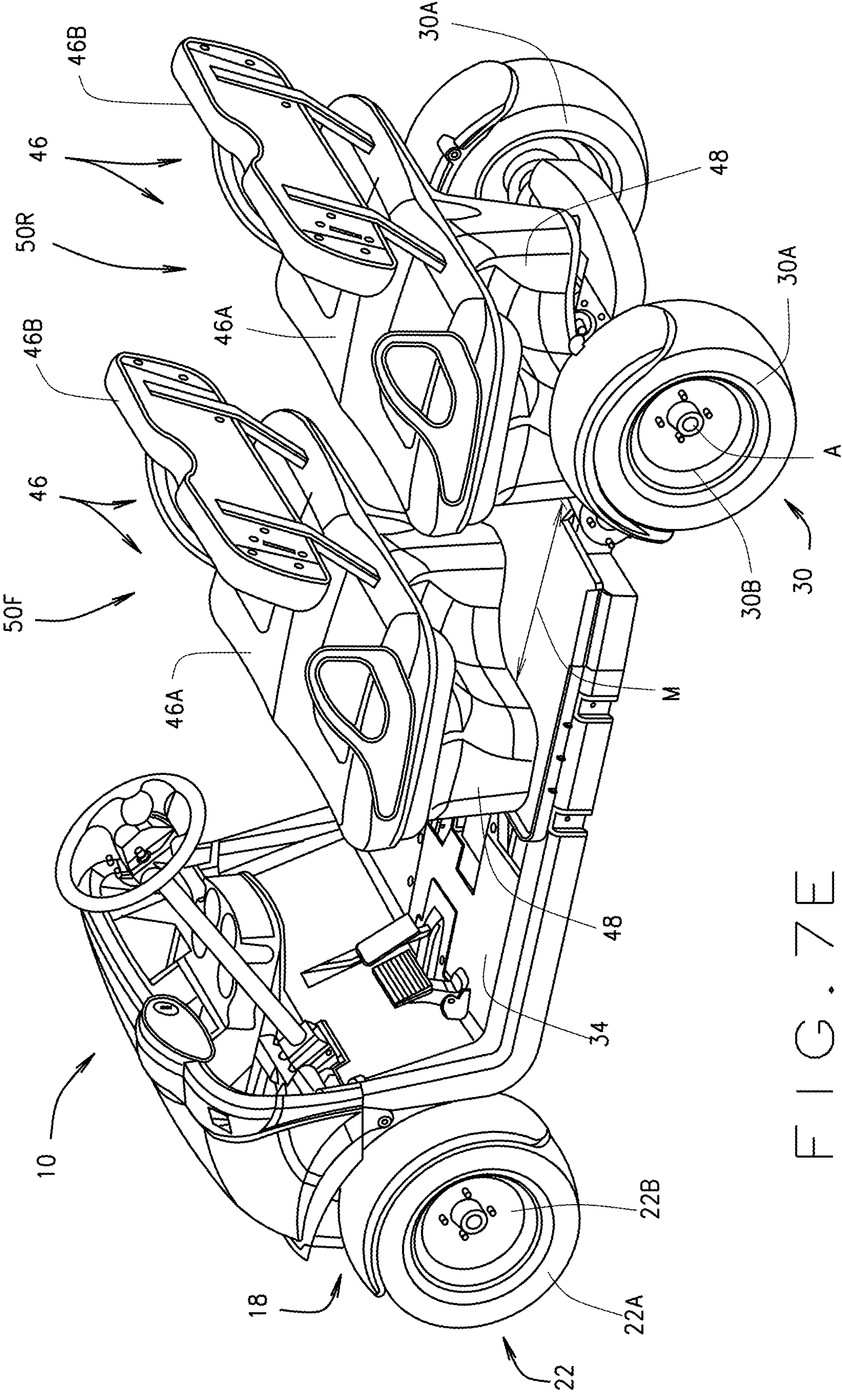
Figure 8:
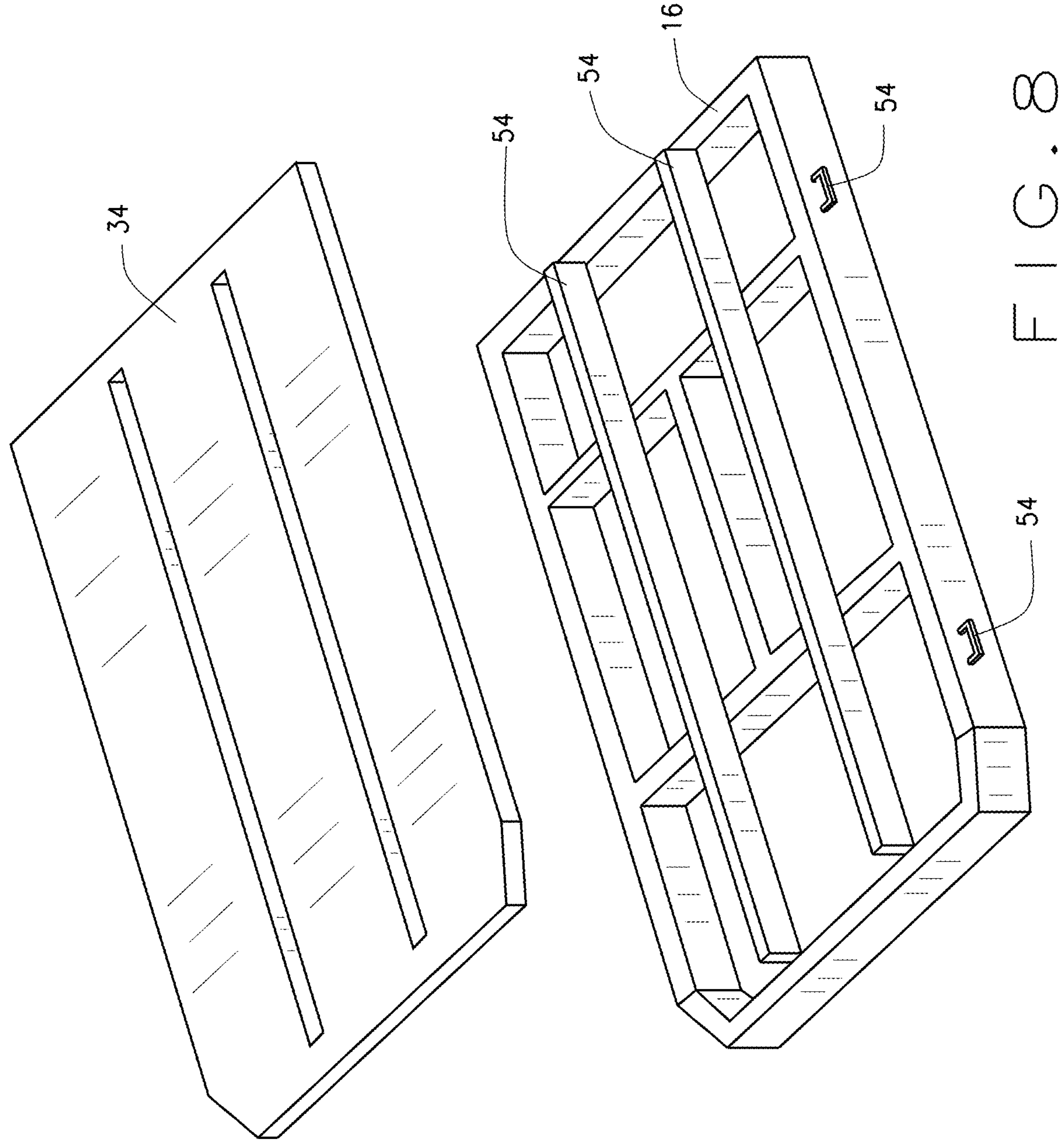

FIG. 8 is an exploded view of an exemplary embodiment of the universal assembly platform shown in FIGS. 1A through 7E comprising one or more component mounting structure, in accordance with various embodiments of the present disclosure.

Figure 9:
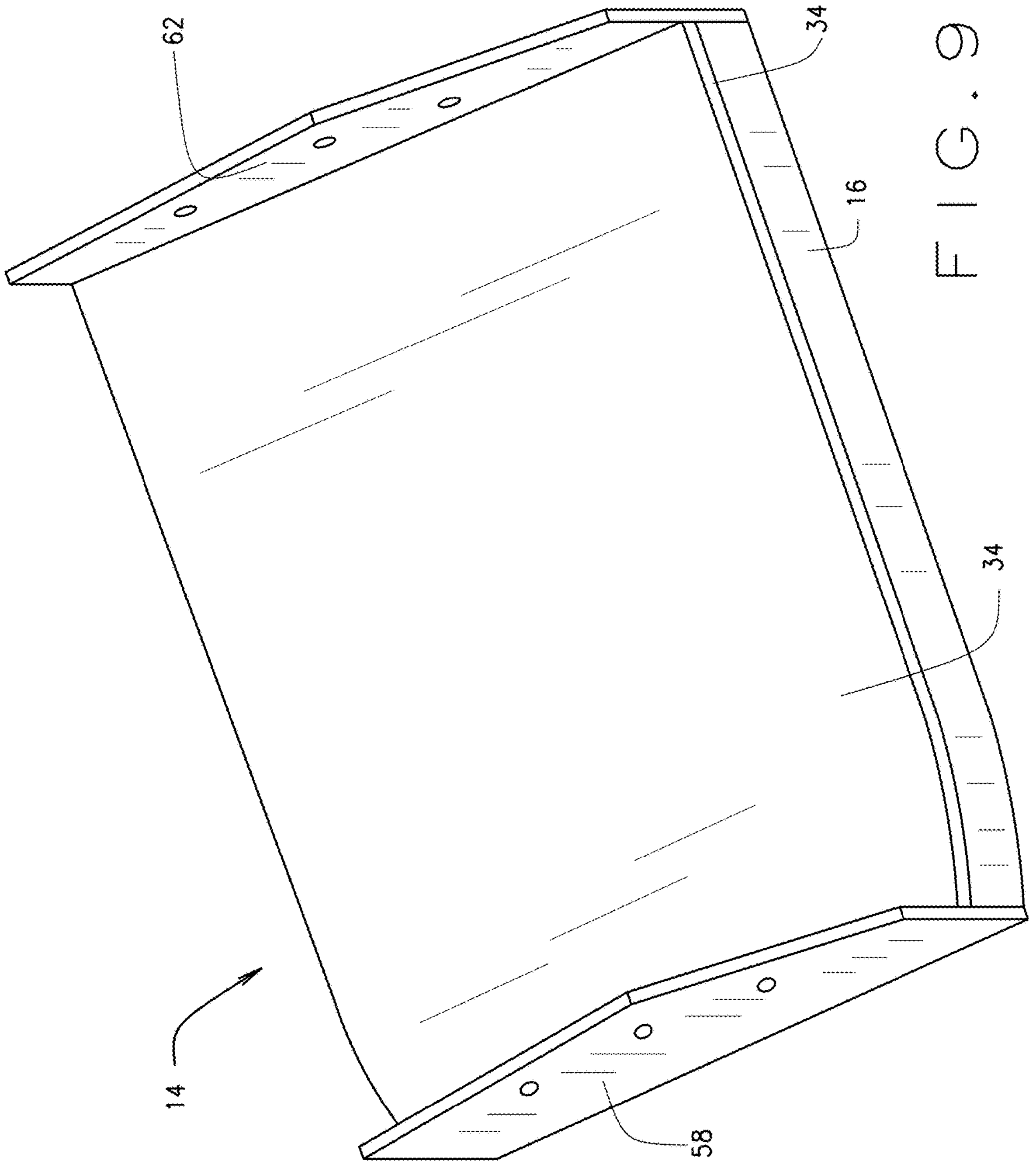

FIG. 9 is an isometric view of an exemplary embodiment universal assembly platform connected to including a front bulkhead and/or a rear bulkhead, in accordance with various embodiments of the present disclosure.

Figure 10A:
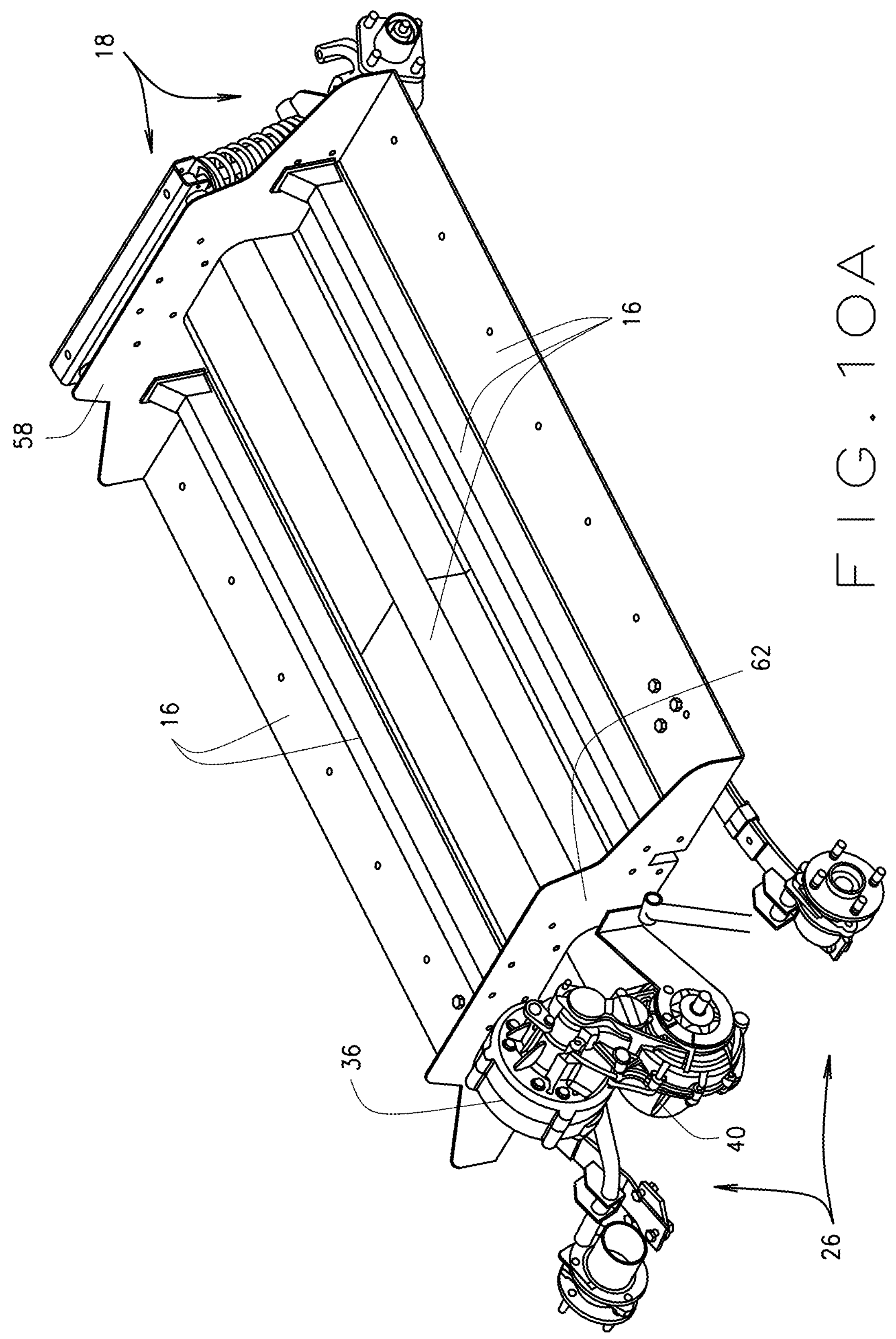

FIG. 10A is an isometric top view of another exemplary embodiment universal assembly platform connected to including the front bulkhead and/or the rear bulkhead, in accordance with various other embodiments of the present disclosure.

Figure 10B:
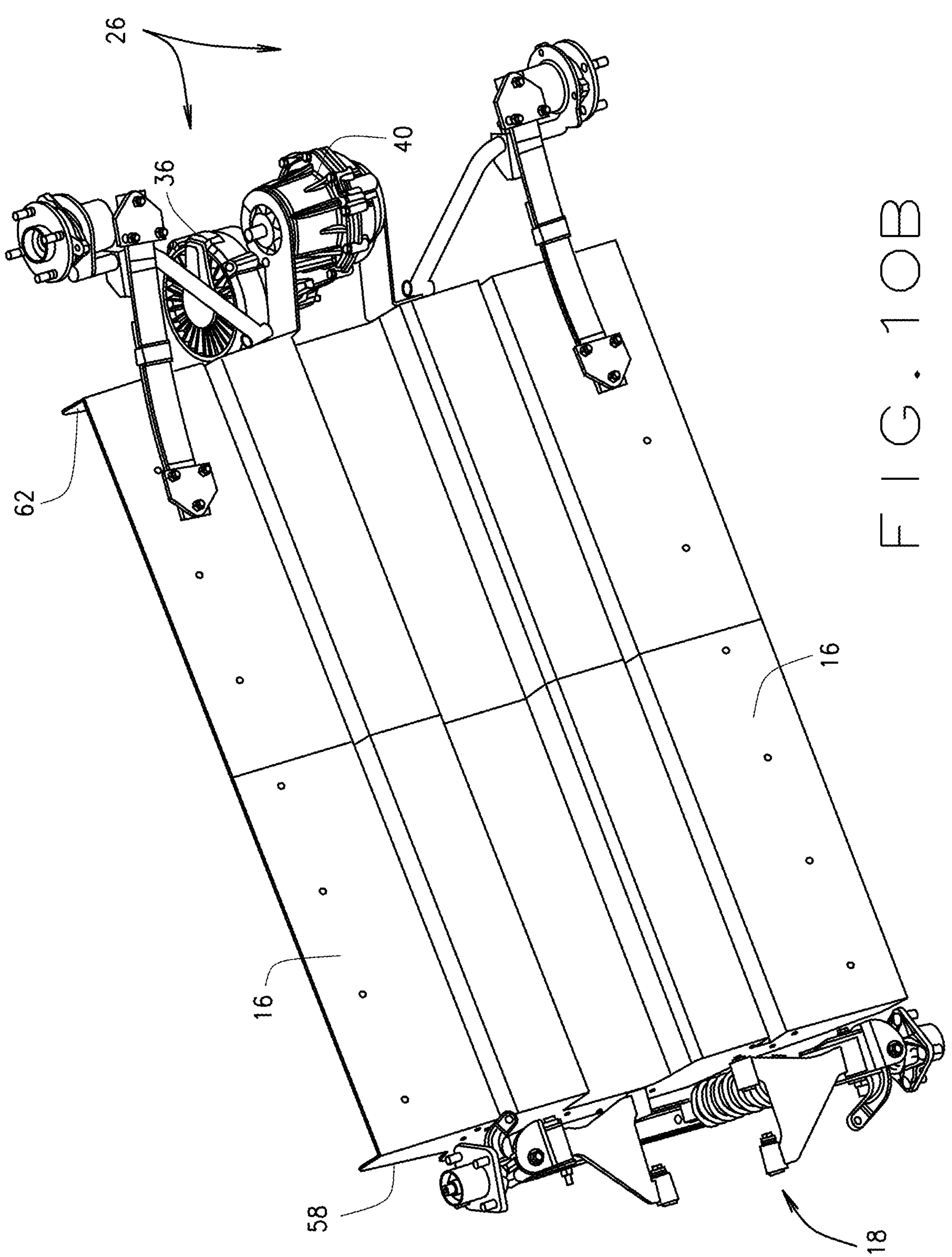

FIG. 10B is an isometric bottom view of the exemplary embodiment universal assembly platform shown in FIG. 10A including a prime mover and a transaxle, in accordance with various other embodiments of the present disclosure.

Corresponding reference numerals indicate corresponding parts throughout the several views of drawings.

DETAILED DESCRIPTION

The following description is merely exemplary in nature and is in no way intended to limit the present teachings, application, or uses. Throughout this specification, like reference numerals will be used to refer to like elements. Additionally, the embodiments disclosed below are not intended to be exhaustive or to limit the invention to the precise forms disclosed in the following detailed description. Rather, the embodiments are chosen and described so that others skilled in the art can utilize their teachings. As well, it should be understood that the drawings are intended to illustrate and plainly disclose presently envisioned embodiments to one of skill in the art, but are not intended to be manufacturing level drawings or renditions of final products and may include simplified conceptual views to facilitate understanding or explanation. As well, the relative size and arrangement of the components may differ from that shown and still operate within the spirit of the invention.

As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims.

Unless otherwise defined, all technical and scientific terms used herein have the same meaning as commonly understood by one of ordinary skill in the art to which this disclosure belongs. The terminology used herein is for the purpose of describing particular example embodiments only and is not intended to be limiting. As used herein, the singular forms "a", "an", and "the" may be intended to include the plural forms as well, unless the context clearly indicates otherwise. The terms "comprises", "comprising", "including", and "having" are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps can be employed.

When an element, object, device, apparatus, component, region or section, etc., is referred to as being "on", "engaged to or with", "connected to or with", or "coupled to or with" another element, object, device, apparatus, component, region or section, etc., it can be directly on, engaged, connected or coupled to or with the other element, object, device, apparatus, component, region or section, etc., or intervening elements, objects, devices, apparatuses, components, regions or sections, etc., can be present. In contrast, when an element, object, device, apparatus, component, region or section, etc., is referred to as being "directly on", "directly engaged to", "directly connected to", or "directly coupled to" another element, object, device, apparatus, component, region or section, etc., there may be no intervening elements, objects, devices, apparatuses, components, regions or sections, etc., present. Other words used to describe the relationship between elements, objects, devices, apparatuses, components, regions or sections, etc., should be interpreted in a like fashion (e.g., "between" versus "directly between", "adjacent" versus "directly adjacent", etc.).

As used herein the phrase "operably connected to" will be understood to mean two are more elements, objects, devices, apparatuses, components, etc., that are directly or indirectly connected to each other in an operational and/or cooperative manner such that operation or function of at least one of the elements, objects, devices, apparatuses, components, etc., imparts are causes operation or function of at least one other of the elements, objects, devices, apparatuses, components, etc. Such imparting or causing of operation or function can be unilateral or bilateral.

As used herein, the term "and/or" includes any and all combinations of one or more of the associated listed items. For example, A and/or B includes A alone, or B alone, or both A and B.

Although the terms first, second, third, etc. can be used herein to describe various elements, objects, devices, apparatuses, components, regions or sections, etc., these elements, objects, devices, apparatuses, components, regions or sections, etc., should not be limited by these terms. These terms may be used only to distinguish one element, object, device, apparatus, component, region or section, etc., from another element, object, device, apparatus, component, region or section, etc., and do not necessarily imply a sequence or order unless clearly indicated by the context.

Moreover, it will be understood that various directions such as "upper", "lower", "bottom", "top", "left", "right", "first", "second" and so forth are made only with respect to explanation in conjunction with the drawings, and that components may be oriented differently, for instance, during transportation and manufacturing as well as operation. Because many varying and different embodiments may be made within the scope of the concept(s) taught herein, and because many modifications may be made in the embodiments described herein, it is to be understood that the details herein are to be interpreted as illustrative and non-limiting.

Figure 1A:
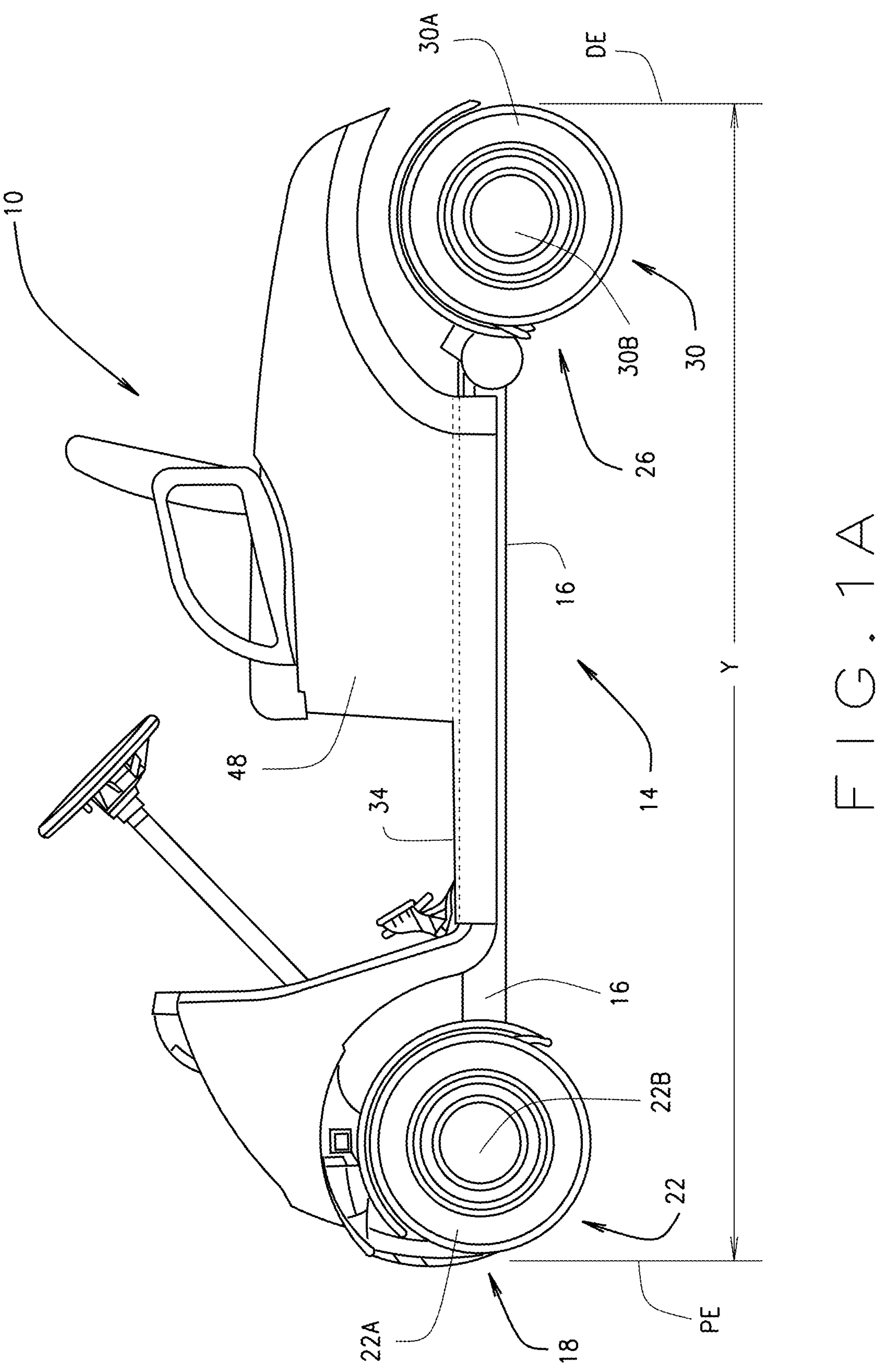
FIG. 1A is a side view of a generic lightweight vehicle constructed utilizing a universal assembly platform, in accordance with various embodiments of the present disclosure.
Figure 1B:
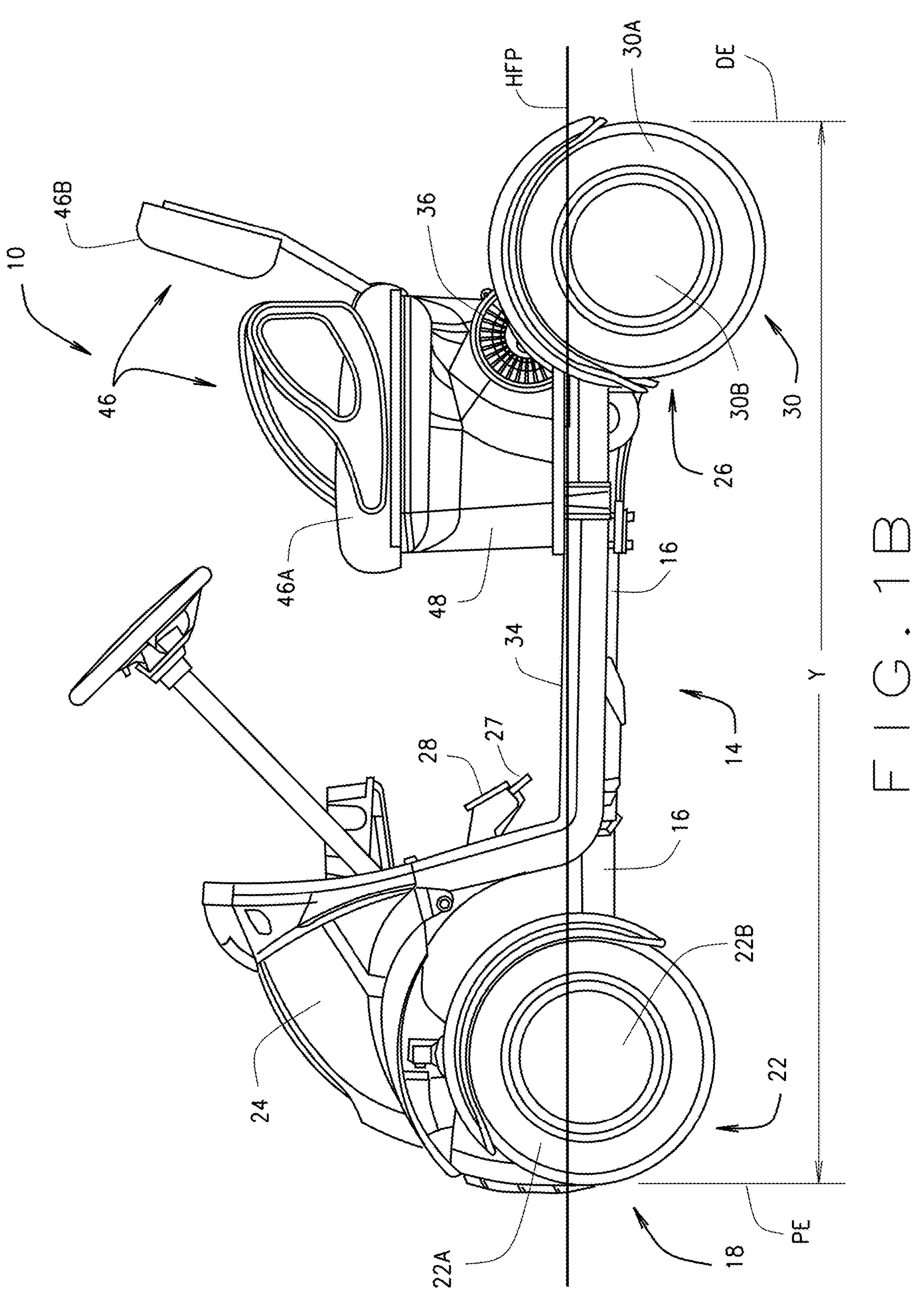
FIG. 1B is a side view of a generic lightweight vehicle constructed utilizing the universal assembly platform shown in FIG. 1A having a shorter overall length, in accordance with various embodiments of the present disclosure.
Figure 1C:
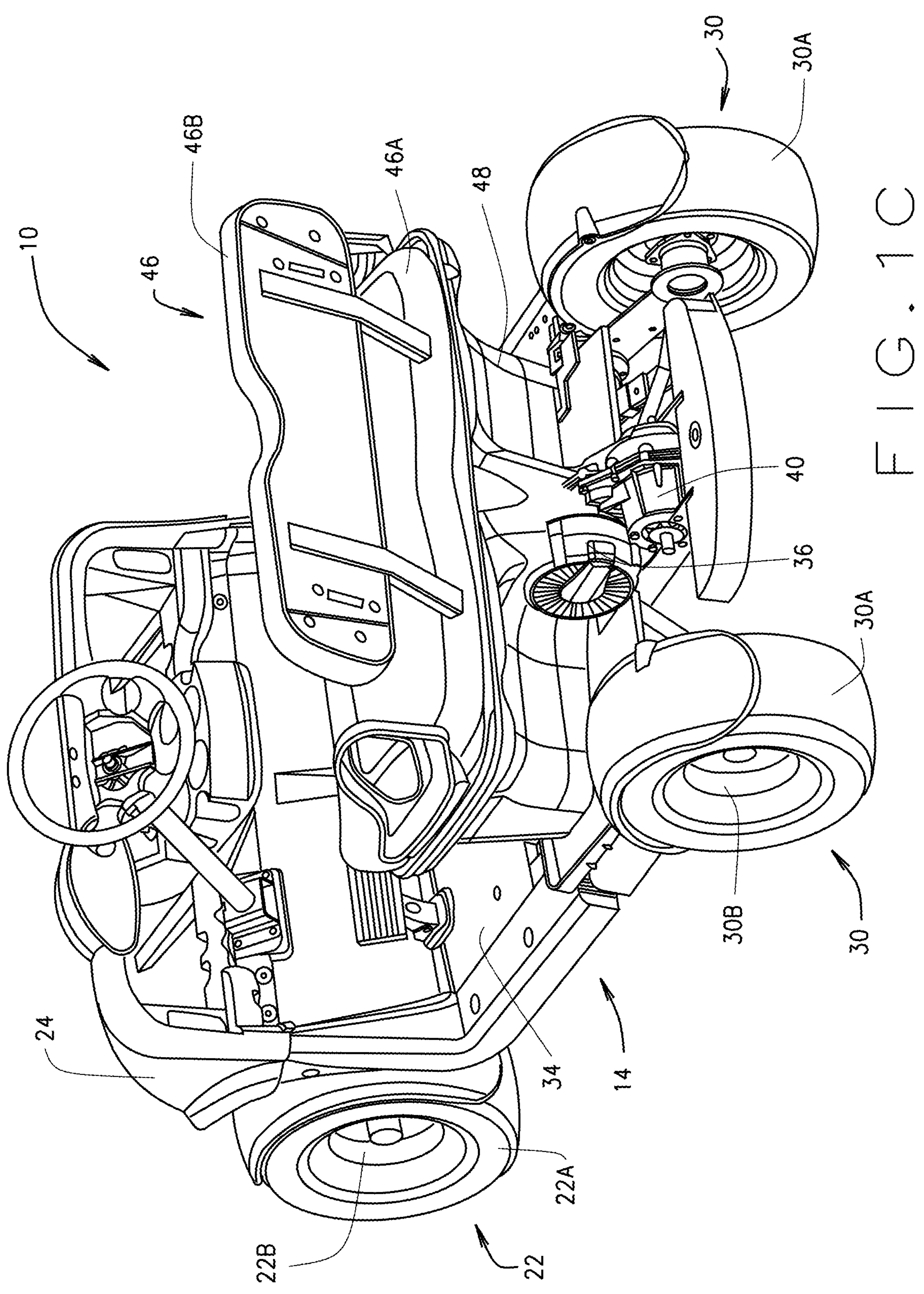
FIG. 1C is a top isometric view of the generic lightweight vehicle shown in FIG. 1B, in accordance with various embodiments of the present disclosure.
Figure 1D:
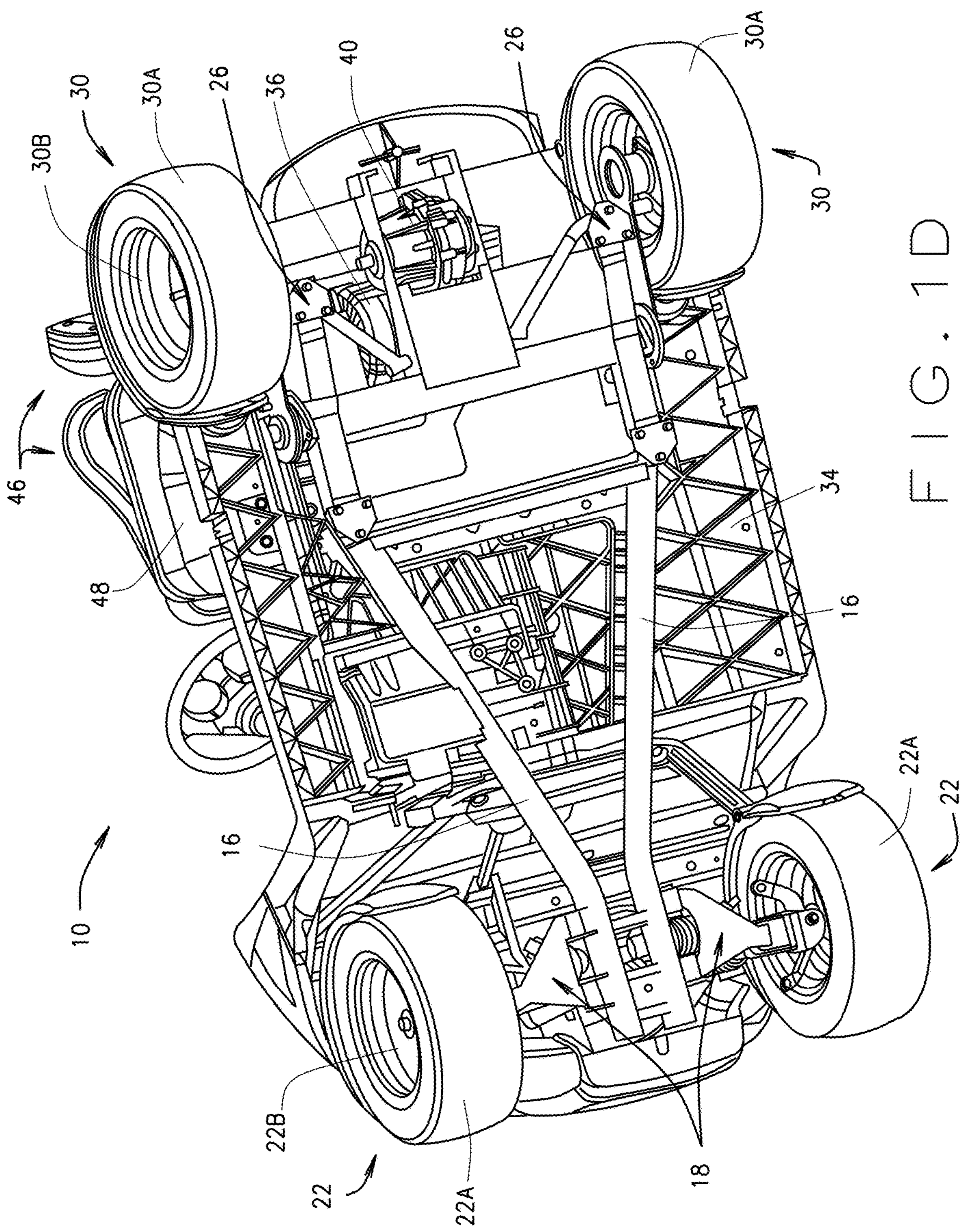
FIG. 1D is a bottom isometric view of the generic lightweight vehicle shown in FIG. 1B, in accordance with various embodiments of the present disclosure.

As illustrated in FIGS. 1A and 1B, in various embodiments, a lightweight vehicle 10 comprises a universal assembly platform 14. In some embodiments the universal assembly platform 14 comprises a main chassis structure 16, a front suspension system 18 connected to a main chassis structure 16, and a rear suspension system 26 connected to the main chassis structure 16. In various embodiments, the lightweight vehicle 10 further comprises a forward facing seating structure 46 connected to the universal assembly platform 14 and a floorboard 34 disposed on top of the main chassis structure 16. In some embodiments a front body structure 24 is mounted to the universal assembly platform 14 and in front of the forward facing seating structure 46 wherein the front body structure 24 provides one or more instrument panels and/or control elements (e.g. ignition switch, operator pedals). In various embodiments, the operator pedals (e.g. and accelerator pedal 27 and a brake pedal 28) extend from the front body structure 24 wherein they hang above the horizontal floorboard plane HFP. In various instances, the combination of the accelerator pedal 27 and brake pedal 28 are referred to as hanging pedals.

Figure 2:
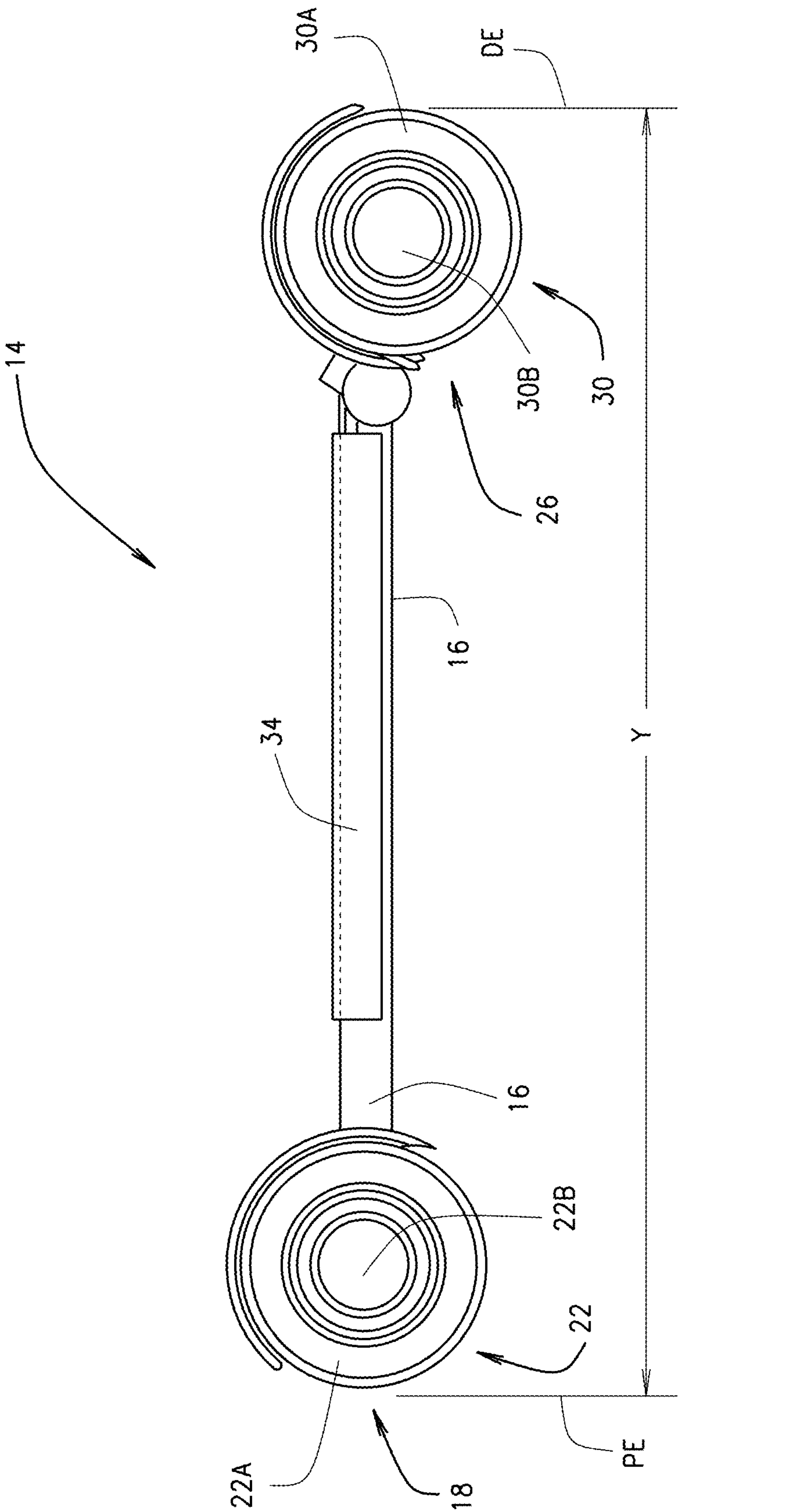
FIG. 2 is side view of a universal assembly platform that can be selectively outfitted to construct a variety of different lightweight vehicles, such as the generic vehicle shown in FIGS. 1A and 1B, in accordance with various embodiments of the present disclosure.

Referring now to FIGS. 1A, 1B and 2, in various embodiments, the lightweight vehicle 10 (exemplarily shown in FIGS. 1A and 1B) is assembled, built, or constructed utilizing the universal assembly platform 14 (exemplarily shown in FIG. 2). In various embodiments, the universal assembly platform 14 provides an assembly platform on which various lightweight vehicles, such as vehicle 10, can be assembled, built, or constructed such that all resulting vehicles built from the same length universal assembly platform 14 will have the same or substantially same longitudinal length Y between a forwardmost side of front tires 22A and a rearmost side of the rear tires 30A, referred to herein as the longitudinal footprint length Y of the vehicle 10. For example, a variation in tire size across lightweight vehicles built from the same length universal assembly platform 14 causes a proportional variation in longitudinal footprint length Y. It will be understood that the vehicle 10 shown in FIGS. 1A and 1B is only an exemplary illustration of a generic vehicle that has been assembled, built, or constructed utilizing the universal assembly platform 14. FIGS. 1A and 1B are only a generic example of the vehicle 10 in accordance with various embodiments. Other exemplary embodiments of vehicle 10 are illustrated and described herein with reference to the various other figures of this disclosure. Particularly, the vehicle 10 as described and illustrated herein can be any lightweight vehicle assembled, built, or constructed utilizing the universal assembly platform 14, and the scope of the present disclosure is not limited to the exemplary vehicle 10 embodiments illustrated and described herein.

The universal assembly platform 14 generally comprises a main vehicle chassis or frame structure 16, a front suspension system 18 connected to a front portion of the main vehicle chassis structure 16 and to which one or more front wheel assembly 22 can be mounted, and a rear suspension system 26 connected to a rear portion of the main vehicle chassis structure 16 and to which one or more rear wheel assembly 30 can be mounted. Particularly, the rear suspension 26 is connected to the main vehicle chassis structure 16 such that when the rear wheel assembly (ies) 30 is/are mounted to the rear suspension system 26 the rear wheel assembly (ies) 30 define(s) the rearmost limit or distal end DE of an overall longitudinal footprint length Y of the resulting vehicle. In various embodiments, the overall vehicle length can be equal to the longitudinal vehicle footprint length Y. In such instances, the distal end DE of the overall length of the resulting vehicle is also the rearmost limit or distal end of the vehicle longitudinal footprint. That is, the distance between a forwardmost side of front tires 22A and a rearmost side of the rear tires 30A is the length of the longitudinal footprint length Y, as well as the overall length of the vehicle. In various embodiments, the universal assembly platform 14 can further include a floorboard 34 disposed over a top of the main vehicle chassis structure 16. The floorboard 34 defines a floor surface of the respective lightweight vehicle constructed utilizing the universal assembly platform 14. In various embodiments the floorboard 34 is configured to fit a specific lateral width of the universal assembly platform 14 wherein the lateral width of the floorboard 34 and the lateral width of the universal assembly platform 14 are similar. For example, in various instances, the lateral width of the universal assembly platform 14 can be between 42 and 52 inches and the lateral width of the floorboard 34 can be between 42 and 52 inches. In various embodiments, the floorboard 34 lateral width defines the lateral width of the overall vehicle 10.

It will be understood that as used herein each of the front and rear wheel assemblies 22 and 30 respectively comprise a front or rear wheel/hub 22B or 30B having a front or rear tire 22A or 30A mounted thereon. It will also be understood that as used herein the rear suspension system 26 comprises the cumulative structures to which the rear wheel assembly(ies) 30 is/are connectable/mountable. For example, the rear suspension system 26 can comprise a pair of opposing independent suspension assemblies 38 mounted to the rearward end of the vehicle chassis 16, each having a respective rear wheel assembly 30 connectable/mountable thereto. Or alternatively, the rear suspension system 26 can comprise a solid axle suspension assembly having a pair of rear wheel assemblies 30 connectable/mountable to opposing ends thereof. In various embodiments, the rear solid axle suspension comprises biasing members (e.g., cantilevered leaf spring, torsion bar, transverse leaf spring, or any other device structured to keep the wheels engaged with the ground). Similarly, the front suspension system 18 can include a pair of opposing independent suspension assemblies connected to the vehicle chassis 16, each having a respective front wheel assembly 22 connectable/mountable thereto. Or alternatively, the front suspension system 18 can comprise a solid axle suspension assembly having a pair of front wheel assemblies 22 connectable/mountable to opposing ends thereof. In various embodiments, the front solid axle suspension comprises biasing members (e.g., cantilevered leaf spring, torsion bar, transverse leaf spring, or any other device structured to keep the wheels engaged with the ground).

In various embodiments the lightweight vehicle 10 further comprises a prime vehicle mover 36 (e.g., an internal combustion engine, an electric motor, or any other device structured and operable to deliver power/torque/motive force) operably connected to one or more the front and/or rear wheel assemblies 22 and/or 30 for moving the vehicle 10 over the ground. For example, in various instances the prime mover 36 can be a permanent magnet AC motor and be operably coupled to a transaxle 40 (shown in FIGS. 10A and 10B) to provide driving force to the front and/or rear wheel assemblies 22 and/or 30 of the vehicle 10. In various embodiments the prime mover 36 can be mounted to the universal assembly platform 14 wherein the entire prime mover 36 is disposed or located at a height lower than a bottom of the seat bottom 46A on the vehicle.

The universal assembly platform 14 provides vehicle manufacturers with the ability to produce/assemble a plurality of different types and/or configurations of vehicles utilizing the same universal assembly platform 14. Therefore, a manufacturer can produce universal assembly platforms 14 having a desired length, width (length and width equals the resulting vehicle's footprint), height, and structural strength and rigidity, and then utilize the universal assembly platforms 14 to assemble golf cars and/or passenger/personal transport vehicles (PTV), and/or utility vehicles, and/or various other lightweight vehicles 10. Accordingly, all vehicles 10 constructed using the universal assembly platform 14 will have the same or substantially same footprint (e.g., substantially the same length and width), and will be able to be shipped within the same or substantially same shipping envelope (e.g., within the same or substantially same space and shipping parameters). For example, a PTV and a golf car constructed utilizing the same universal assembly platform 14 will have the same or substantially same overall length Y of the longitudinal vehicle footprint, and will be able to be shipped within the same or substantially same shipping envelope.

Moreover, in various embodiments, the universal assembly platform 14, having the rear suspension system 26 connected to the main vehicle chassis structure 16 such that when the rear wheel assembly (ies) 30 is/are mounted to the rear suspension system 26 the rear wheel assembly (ies) 30 define(s) the rear limit of an overall length Y of the longitudinal vehicle footprint, can be utilized to construct a golf car (e.g., the golf car exemplarily illustrated FIGS. 6B and 7B). In various embodiments the golf car comprises one or more golf bag holders 70 disposed behind the rearmost forward facing seat 46 of the vehicle 10 where the golf bag holder 70 is configured to hold at least one golf bag 74. In various embodiments the golf bag holder 70 is configured to support the golf bag 74 wherein the base of the golf bag 74 is located substantially forward the top of the golf bag 74. In various embodiments, the universal assembly platform 14 can be utilized to construct the vehicle 10 (e.g., a golf car) having a longitudinal footprint length Y of equal to or less than 106 inches, for example, between 81 and 95 inches, e.g., in various instances equal to or less than 81 inches. In various embodiments, a golf car vehicle 10 having only a first/front row forward facing seating structure 50 can be constructed on the universal platform 14 having a shorter longitudinal footprint length Y than a vehicle having first and second row forward facing seating structures 50F and 50R (e.g. the short golf car illustrated in FIG. 1B). For example the longitudinal footprint length Y of a golf car 10 can be 81 inches or less while a personal transport vehicle (PTV) can be constructed to have a longitudinal footprint length Y of 95 inches or less.

Moreover still, since, as described above, a golf car and a PTV can be constructed utilizing the universal assembly platform 14 described herein such that the resulting golf car and PTV have the same or substantially the same longitudinal footprint length Y, the universal assembly platform 14 can be utilized to construct a PTV having a forward facing rear seat (such as the PTV exemplarily illustrated in FIGS. 6D, 7D and 7E).

The vehicle chassis structure 16 can be any suitable vehicle chassis structure or vehicle frame that is structured and operable to provide the main support structure on which the vehicle 10 is assembled or built, and to which the front and rear suspension systems 18 and 26 can be connected. For example, in various embodiments, the main vehicle chassis structure 16 can comprise a frame, for example a metal (e.g., steel or aluminum) frame, that includes a plurality of interconnected or joined solid beams or hollow tubes that provide the rigidity and structural integrity of main vehicle chassis structure 16, such as exemplarily illustrated in FIGS. 3A and 3B. Or, for example, in various embodiments, the main vehicle chassis structure 16 can comprise a corrugated unibody floor pan comprising a plurality of alternating raised ridges and recessed channels that provide the rigidity and structural integrity of main vehicle chassis structure 16, such as exemplarily illustrated in FIG. 3C. In various embodiments, (as exemplarily illustrated in FIGS. 10A and 10B) the main vehicle chassis structure 16 comprises a raised tunnel structure that provides clearance for powertrain components (e.g. the vehicle prime mover, driveshaft, differential, or any other devices configured to transmit power to one or more of the front and/or wheel assemblies 22 and/or 30). For example the raised tunnel structure can span the entire longitudinal length of the main chassis structure 16 and is located laterally in the middle section of the main chassis structure 16.

In various embodiments, the rear suspension system 26 can be any rear suspension system that, when connected to the main vehicle chassis 16, is structured to dispose the rear wheel assembly(ies) 30 at the rear of the main vehicle chassis structure 16 such the rear wheel assembly(ies) 30 define(s) the rearmost limit or distal end DE of an overall length Y of the longitudinal footprint of the resulting vehicle 10, and hence the rearmost limit or distal end of the footprint of the vehicle 10. For example, as described above, in various embodiments wherein the vehicle 10 includes two rear wheel assemblies 30 (as exemplarily illustrated throughout the figures), the rear suspension system 26 can comprise a pair of independent suspension assemblies 38 as exemplarily illustrated in FIGS. 4A, 4B and 4C. Alternatively, in various other embodiments, wherein the vehicle 10 includes two rear wheel assemblies 30 (as exemplarily illustrated throughout the figures), the rear suspension system 26 can comprise beam axle, rigid axle or solid axle suspension assembly 42 as exemplarily illustrated in FIGS. 5A, 5B and 5C.

Referring now to FIGS. 6A, 6B, 6C, 6D, 7A, 7B, 7C, 7D and 7E, as described above, the universal assembly platform 14 provides vehicle manufacturers with the ability to produce/assemble a plurality of different types and/or configurations of vehicles utilizing the same universal assembly platform 14. Particularly, a manufacturer can produce universal assembly platforms 14 having a desired length, width, height, and structural strength and rigidity, and then utilize the universal assembly platforms 14 (each having same the length, width, height, and structural strength and rigidity) to assemble golf cars and/or transport vehicles, and/or utility vehicles, and/or various other lightweight vehicles. Hence, the universal assembly platform 14 can be manufactured to have various lengths, widths, heights, and structural strength and rigidity based on the desired vehicle type and vehicle configuration to be assembled.

For example, with reference to FIGS. 6A, 6B, 6C and 6D, a universal assembly platform $\mathbf{14}_1$ having a length of $X_1$ can be fabricated for use in assembling a vehicle $\mathbf{10}_1$ (generically illustrated in FIG. 6A) having the longitudinal footprint length of Y and configured to have a rear suspension system 26 comprising a solid beam rear suspension assembly 42 that is connected to the chassis 16 such that the universal platform length $X_1$ is located within the range defined by the longitudinal footprint Y of the vehicle 10. For example, the entire universal assembly platform 14 is forward of the distal end DE of the vehicle longitudinal footprint Y, and rearward of an opposing proximal end PE of the longitudinal vehicle footprint Y. Particularly, the solid beam rear suspension assembly 42 is connected to the chassis 16 such that the universal platform length $X_1$ is located within the range defined by the longitudinal footprint Y of the vehicle $\mathbf{10}_1$, wherein the rearmost surface of the rear tire 30A is behind the rearmost portion of the universal platform $\mathbf{14}_1$ and the forwardmost portion of the front tire 22A is in front of the forwardmost portion of the universal platform $\mathbf{14}_1$. As described above in various embodiments, the overall longitudinal footprint length Y of the vehicle $\mathbf{10}_1$ can be equal to or less than 106 inches, for example, between 81 and 95 inches, e.g., in various instances equal to or less than 81 inches.

As used herein, the word "forward" and the phrase "forward of" are used to describe the direction from a named component or structure toward the front of the vehicle (e.g., vehicle 10, $\mathbf{10}_1$, or $\mathbf{10}_2$). Similarly, as used herein, the word "rearward" and the phrase "rearward of" are used to describe the direction from a named component or structure toward the rear of the vehicle (e.g., vehicle 10, $\mathbf{10}_1$, or $\mathbf{10}_2$).

As exemplarily illustrated in FIGS. 6B, 6C and 6D, the vehicle $\mathbf{10}_1$ can be any desired lightweight vehicle, such as a golf car, a lightweight utility/work vehicle, a passenger transport vehicle having a forward facing rear seat, etc., wherein each such vehicle $\mathbf{10}_1$ is constructed using the same universal assembly platform $\mathbf{14}_1$. Additionally, as further illustrated in FIGS. 6A, 6B, 6C and 6D each of the vehicles $\mathbf{10}_1$ constructed using the universal assembly platform $\mathbf{14}_1$ has the same longitudinal footprint length Y, and moreover, the same footprint dimensions. In various embodiments, the longitudinal footprint Y varies when different tire sizes are used across vehicles and the wheelbase $X_1$ remains the same.

As a further example, with reference to FIGS. 7A, 7B, 7C, 7D and 7E, a universal assembly platform $\mathbf{14}_2$ having a length of $X_2$ can be fabricated for use in assembling a vehicle $\mathbf{10}_2$ (generically illustrated in FIG. 7A) having the overall longitudinal footprint length of Y and configured to have a rear suspension system 26 comprising a pair of opposing independent suspension assemblies 38 connected to the vehicle chassis 16 such that universal platform length $X_2$ is located within the range defined by the longitudinal footprint Y of the vehicle 10. For example the entire universal assembly platform 14 is forward of the distal end DE, and rearward of an opposing proximal end PE of the longitudinal vehicle footprint Y. Particularly, the opposing independent suspension assemblies 38 are connected to the vehicle chassis 16 such that the universal platform length $X_2$ is located within the range defined by the longitudinal footprint Y of the vehicle, e.g., rearmost surface of the rear tire 30A is behind the rearmost portion of the universal platform $\mathbf{14}_2$ and the forwardmost portion of the front tire 22A is in front of the forwardmost portion of the universal platform $\mathbf{14}_2$. As described above in various embodiments the overall longitudinal footprint length Y of the vehicle $\mathbf{10}_2$ can be equal to or less than 106 inches, for example, between 81 and 95 inches, e.g., in various instances equal to or less than 81 inches.

As exemplarily illustrated in FIGS. 7B, 7C, 7D and 7E, the vehicle $\mathbf{10}_2$ can be any desired lightweight vehicle, such as a golf car, a lightweight utility/work vehicle, a passenger transport vehicle having a forward facing rear seat, etc., wherein each such vehicle $\mathbf{10}_2$ is constructed using the same universal assembly platform $\mathbf{14}_2$. Additionally, as further illustrated in FIGS. 7A, 7B, 7C, 7D and 7E each of the vehicles $\mathbf{10}_2$ constructed using the universal assembly platform $\mathbf{14}_2$ has the same longitudinal footprint length Y, and moreover, the same footprint dimensions. In various embodiments, the longitudinal footprint Y varies when different tire sizes are used across vehicles and the wheelbase $X_2$ remains the same.

Referring now to FIGS. 1A, 1B, 2 and 3A through 7E constructing a vehicle 10 utilizing the universal assembly platform 14 as described herein, provides greater flexibility in vehicle design and in placement, location, orientation, and configuration of various vehicle components such as the vehicle passenger seat(s) 46 (comprising seat bottom(s) 46A and seat back(s) 46B and associated pedestal(s) 48, cumulatively referred to herein as the seating structures 50. For example, as exemplarily shown in FIGS. 6B and 7B, the vehicle 10 configured as a golf car utilizing the universal assembly platform 14 allows for more space and flexibility for the placement, orientation, location and configuration of the golf bag retention system.

As another example, as exemplarily shown in FIGS. 6C and 7C, the vehicle 10 configured as a utility vehicle utilizing the universal assembly platform 14 allows the vehicle 10 to be configured with a cargo bed 66 (e.g, fixed or dump cargo bed) located directly above the rear suspension system 26. In various embodiments, a pivot location P of a dump cargo bed 66 can be located longitudinally forward of an axis A extending through and or between the radial center(s) of the rear wheel assembly (ies) 30. Locating the cargo bed 66 directly above the rear suspension 26 provides improved vehicle control and stability and increased cargo capacity and load limit. In various embodiments, the cargo bed 66 can comprise a main section 66A and a front section 66B wherein a bottom surface 66C of the main section 66A is located at a height above a bottom surface 66D of the front section 66B. In various instances, the bottom surfaces 66C and 66D of the mane front sections 66A and 66B of the cargo bed 66 is located at a height below the seat bottom 46A.

As yet another example, as exemplarily shown in FIGS. 6D, 7D and 7E, the vehicle 10 configured as a passenger transport vehicle utilizing the universal assembly platform 14 allows the vehicle 10 to be configured with a second/rear row of forward facing seats 46, i.e., a second/rear row forward facing rear seating structure 50R located behind a first/front row forward facing front seating structure 50F. In such configurations, the universal assembly platform 14 allows the second/rear row seating structure 50R to be located directly above the rear suspension system 26, in various instances directly above a axis A extending through and or between the radial center(s) of the rear wheel assembly (ies) 30, such that the second/rear row seating structure 50R is sufficiently spaced apart from the first/front row seating structure 50 to provide ample and comfortable foot room, or footwell, distance M therebetween. In various embodiments, the second/rear row seating structure 50R can be mounted to the universal assembly platform 14 such that a portion of the second/rear row seating structure 50R is not directly above the main chassis structure 16. For example, in various instances the second/rear row seating structure 50R is cantilevered past the universal assembly platform length $X_1$ or $X_2$. In various embodiments, the second/rear row seating structure 50R can be located directly above the axis A such that at least a portion of the seat back 46B of the rear row seating structure 50R is located rearward beyond or behind the axis A. For example, in various instances the entire seat back 46B can be located rearward beyond or behind the axis A. In some embodiments the seat back 46B extends past the distal end DE of the longitudinal footprint Y and/or of the rearmost portion of the rear tire 30A. In various instances, the second/rear row seating pedestal 48 has a height H1 that can be equal to the first/front row seating pedestal height H. In various embodiments, the second/rear row seating pedestal height H1 can be greater than the first/front row seating pedestal height H.

In various embodiments, the front row seat 46 and seating structure 50 is the forward most seat 46 and seating structure 50 of the personal transport vehicle 10, i.e., the seat 46 and seating structure 50 that is located nearest the front of the respective personal transport vehicle 10, in which the driver of the respective vehicle 10 will be seated to operate the respective personal transport vehicle 10. Furthermore, the rear row seat 46 and seating structure 50R of the personal transport vehicle 10 is the one or more rows of seats 46 and seating structures 50R located behind or rearward (i.e., toward the rear of the vehicle 10) of the front row seat 46 and seating structure 50.

Referring now to FIGS. 6D, 7D and 7E, as described above, in various embodiments the universal assembly platform 14 (e.g., $\mathbf{14}_1$ in FIG. 6D and $\mathbf{14}_2$ in FIGS. 7D and 7E) can be utilized to construct a passenger transport vehicle 10 (e.g., $\mathbf{10}_1$ in FIG. 6D and $\mathbf{10}_2$ in FIGS. 7D and 7E) having a rear row seat 46 and seating structure 50R that is forward facing (i.e., passengers utilizing the rear row seat 46 and seating structure 50R will be seated facing forward toward the front of the vehicle 10) with a foot room or footwell, distance M between the front row seat 46 and seating structure 50. In various embodiments, the foot room/footwell distance M can be between 18 and 36 inches, e.g., 18 to 24 inches. And moreover, such passenger transport vehicles 10 having the forward facing rear seating structure 50R can be constructed utilizing the universal assembly platform 14, wherein the resulting vehicle 10 can have the same overall longitudinal footprint length Y as other vehicles constructed utilizing the universal platform 14 (e.g., golf cars constructed utilizing the universal platform 14). And still further, as exemplarily shown in FIG. 1B, golf cars constructed utilizing the universal platform 14 can have a shorter longitudinal footprint length Y than passenger transport vehicles 10 having the forward facing rear seating structure 50R. For example, the golf car shown in FIG. 1B can be constructed utilizing a shorter universal assembly platform 14.

As shown in FIGS. 6D, 7D and 7E, when the personal transport vehicle 10 (e.g., $\mathbf{10}_1$ in FIG. 6D and $\mathbf{10}_2$ in FIG. 7D) is constructed utilizing the universal assembly platform 14 (e.g., $\mathbf{14}_1$ in FIG. 6D and $\mathbf{14}_2$ in FIG. 7D) the forward facing rear seating structure 50R is disposed on (e.g., mounted on or connected to) the chassis 16 and/or the floorboard 34 and/or other support structure such that the forward facing rear seating structure 50R is disposed directly above, and in various instances, substantially centered above, the axis A of the rear wheel assemblies 30. As used herein, describing that in various instances the forward facing rear seating structure 50R is disposed directly above and substantially centered above the axis A of the rear wheel assemblies 30 means that the forward facing rear seating structure 50R is disposed directly above the axis A such that approximately half of the rear row seat pedestal 48 is oriented, disposed, positioned or aligned forward of the axis A, and approximately half of the rear row seat pedestal 48 is oriented, disposed, positioned or aligned rearward of the axis A.

Moreover, chassis structure 16 is structured to have a substantially flat, planar profile such that a bottom of the seat pedestal 48 of the forward facing rear seating structure 50R is disposed on same plane P as a bottom of the seat pedestal of the forward facing front seating structure 50. For example, in various embodiments, due to the substantially flat, planar profile of the chassis structure 16, the forward facing rear seating structure 50R is disposed on (e.g., mounted on or connected to) the chassis 16 and/or the floorboard 34 and/or other support structure such that the junction where the rear row seat pedestal 48 contacts the chassis 16 and/or the floorboard 34 and/or other support structure to which it is mounted is substantially in the same plane P as the junction where the front row seat pedestal 48 contacts the chassis 16 and/or the floorboard 34 and/or other support structure to which it is mounted. Furthermore, the floor surface, e.g., the floorboard 34, on which a passenger sitting the rear row seat 46 will rest his/her feet is in substantially the same plane P as the floor surface, e.g., the floorboard 34, on which a passenger sitting the front row seat 46 will rest his/her feet. Still further in various embodiments, the height H of front pedestal 48 is substantially the same as the height H1 of the rear row seat pedestal 48 H such that the front and rear row seat bottoms 46A are disposed, located or oriented at the same height above the floorboard 34 and/or the chassis 16. In various embodiments, the height H1 is greater than the height H. Still yet further, the chassis 16 of the universal assembly platform is constructed such that a top surface or side of the entire chassis 16 lays within the same plane P such that the front and rear row seat pedestals 48 are mounted on or connected to the chassis 16 and/or the floorboard 34 and/or other support structure in substantially the same plane P.

Referring now to FIG. 8, in various embodiments, the universal assembly platform 14 can further comprise at least one vehicle component mounting structure 54 that is/are integrally formed with and/or mounted to the main vehicle chassis structure 16. The vehicle component mounting structure(s) 54 is/are structured and operable to enable at least one vehicle component to be mounted to the universal assembly platform 14 during assembly/construction of the vehicle 10. The vehicle component mounting structure(s) 54 can be any structure suitable for connecting or mounting vehicle components such as the seat pedestals 48, a front cowl of the vehicle, side panels of the vehicle, rollover protection systems (ROPS), canopy systems, the floorboard 34, etc. For example, in various instances the vehicle component mounting structure(s) 54 can be track(s) or channel(s) integrally formed with or connected to (e.g., welded to) the main vehicle chassis structure 16 for adjustably/movably mounting the seat pedestals 48 (or other vehicle components) to the main vehicle chassis structure 16. Or, the vehicle component mounting structure(s) can be hooks, or loops, or flanges, or tabs, or threaded bolts, or threaded holes, etc., that can be utilized to connect or mount various other vehicle components (e.g., front cowl, side panels, ROPS, canopy systems, the floorboard 34, etc.) to the main vehicle chassis structure 16. Although FIG. 8 exemplarily illustrates the vehicle component mounting structure(s) 54 integrally formed with or connected to the chassis 16 illustrated in FIG. 3A, it should be understood that the vehicle component mounting structure(s) 54 can be integrally formed with or connected to any suitable chassis 16 such as those exemplarily illustrated in FIGS. 3B and 3C, or any other suitable chassis utilized to provide the chassis 16 for the universal assembly platform 14 as described herein.

Referring now to FIGS. 9 and 10, in various embodiments, the universal assembly platform 14, as exemplarily illustrated in FIGS. 1A through 8, can be connected to or include a front bulkhead 58 and/or a rear bulkhead 62 that are structured and operable to provide a connection means, or connecting structure for mounting various components of the vehicle 10 to the universal assembly platform 14. For example, in various instances, the front bulkhead 58 can be utilized to mount or connect the front suspension system 18 to the universal assembly platform 14, and/or the rear bulkhead 62 can be utilized to mount or connect the rear suspension system 26 to the universal assembly platform 14. Alternatively, the front and/or rear bulkhead(s) 58 and/or 62 can be utilized to mount a vehicle prime mover (e.g., an internal combustion engine and/or an electric motor) to the universal assembly platform 14, or to mount all or a portion of the vehicle powertrain and/or driveline to the universal assembly platform 14, or to mount any other vehicle component to the universal assembly platform 14.

The description herein is merely exemplary in nature and, thus, variations that do not depart from the gist of that which is described are intended to be within the scope of the teachings. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the disclosure. Such variations and alternative combinations of elements and/or functions are not to be regarded as a departure from the spirit and scope of the teachings.

The invention claimed is:

1. A lightweight vehicle comprising:

a pair of rear wheel assemblies;

a pair of front wheel assemblies;

a chassis;

a front suspension system coupling the pair of front wheel assemblies to the chassis;

a rear suspension system coupling the pair of rear wheel assemblies to the chassis;

a frontmost seat configured to accommodate a plurality of first occupants, the frontmost seat including a first seat bottom, a first seat back, and a pedestal supported by the chassis and supporting the first seat bottom;

a rearmost seat configured to accommodate a plurality of second occupants, the rearmost seat supported by the chassis, the rearmost seat facing forward, the rearmost seat including a second seat bottom and a second seat back, at least a portion of the second seat bottom of the rearmost seat is located longitudinally rearward of an axis extending through a center of the pair of rear wheel assemblies;

a floorboard coupled the chassis, the floorboard providing a first footwell in front of the frontmost seat for feet of the plurality of first occupants and a second footwell in front of the rearmost seat for feet of the plurality of second occupants, the second footwell being planar and extending along a single plane entirely between a first outer lateral edge of the chassis to a second, opposing outer lateral edge of the chassis; and a drivetrain configured to drive the pair of rear wheel assemblies, at least a portion of the drivetrain positioned beneath the second seat bottom.

2. The lightweight vehicle of claim 1, wherein the floorboard has a lateral width that is at least one of (a) greater than 42 inches or (b) less than or equal to 52 inches.

3. The lightweight vehicle of claim 1, wherein a longitudinal length between a frontmost portion of the pair of front wheel assemblies and a rearmost portion of the pair of rear wheel assemblies is at least one of (a) at least 81 inches or (b) at most 106 inches.

4. The lightweight vehicle of claim 1, wherein a frontmost portion of the pair of front wheel assemblies is longitudinally forward of a front end of the chassis.

5. The lightweight vehicle of claim 1, wherein the rear suspension system includes a pair of leaf springs having forward ends coupled to interfaces positioned beneath the chassis.

6. The lightweight vehicle of claim 1, wherein a lateral side of the pedestal is laterally offset from a lateral edge of the floorboard.

7. The lightweight vehicle of claim 1, wherein the first footwell and the second footwell are coplanar.

8. The lightweight vehicle of claim 1, wherein the drivetrain includes an electric motor positioned directly beneath the second seat bottom.

9. The lightweight vehicle of claim 1, wherein the first seat bottom and the second seat bottom are positioned at different heights above the floorboard.

10. The lightweight vehicle of claim 1, wherein the first seat bottom and the second seat bottom are positioned at the same height above the floorboard.

11. The lightweight vehicle of claim 1, wherein the rearmost seat includes a rear hip restraint, and wherein a first portion of the rear hip restraint is positioned forward of the axis and a second portion of the rear hip restraint is positioned rearward of the axis.

12. The lightweight vehicle of claim 1, wherein an uppermost portion of the pedestal extends a greater distance from front to back than a base of the pedestal.

13. The lightweight vehicle of claim 1, wherein an uppermost portion of the pedestal extends rearward of a rear end of a base of the pedestal.

14. A lightweight vehicle comprising:

a pair of rear wheel assemblies;

a pair of front wheel assemblies;

a chassis, wherein at least a portion of the chassis has a planar structure;

a front suspension system coupling the pair of front wheel assemblies to the chassis;

a rear suspension system coupling the pair of rear wheel assemblies to the chassis;

a frontmost seat supported by the chassis, the frontmost seat including a first seat bottom and a first seat back;

a rearmost seat supported by the chassis, the rearmost seat facing forward, the rearmost seat including a second seat bottom and a second seat back, at least a portion of the rearmost seat is located longitudinally rearward of an axis extending through a center of the pair of rear wheel assemblies;

a floorboard coupled the chassis, the floorboard providing a first footwell in front of the frontmost seat and a second footwell in front of the rearmost seat; and an electric motor configured to drive the pair of rear wheel assemblies and at least partially positioned directly beneath the second seat bottom.

15. The lightweight vehicle of claim 14, wherein the frontmost seat includes a pedestal supported by the chassis and supporting the first seat bottom.

16. The lightweight vehicle of claim 15, wherein the frontmost seat is configured to accommodate a plurality of occupants.

17. The lightweight vehicle of claim 16, wherein the pedestal is spaced inward from lateral edges of the planar structure.

18. The lightweight vehicle of claim 14, wherein at least a portion of the second seat bottom is located longitudinally rearward of the axis.

19. The lightweight vehicle of claim 14, wherein the first footwell and the second footwell are coplanar.

20. The lightweight vehicle of claim 14, wherein at least one of:

(a) the floorboard has a lateral width that is at least one of (i) greater than 42 inches or (ii) less than or equal to 52 inches; or (b) a longitudinal length between a frontmost portion of the pair of front wheel assemblies and a rearmost portion of the pair of rear wheel assemblies is at least one of (i) at least 81 inches or (ii) at most 106 inches.

21. The lightweight vehicle of claim 14, wherein a frontmost portion of the pair of front wheel assemblies is longitudinally forward of a front end of the chassis.

22. The lightweight vehicle of claim 14, wherein the first footwell and the second footwell are coplanar.

23. A lightweight vehicle comprising:

a pair of rear wheel assemblies;

a pair of front wheel assemblies;

a chassis;

a front suspension system coupling the pair of front wheel assemblies to the chassis;

a rear suspension system coupling the pair of rear wheel assemblies to the chassis;

a frontmost seat supported by the chassis, the frontmost seat including a first seat bottom and a first seat back;

a rearmost seat supported by the chassis, the rearmost seat facing forward, the rearmost seat including a second seat bottom and a second seat back, at least a portion of the rearmost seat is located longitudinally rearward of an axis extending through a center of the pair of rear wheel assemblies;

a floorboard coupled the chassis, the floorboard providing a first footwell in front of the frontmost seat and a second footwell in front of the rearmost seat; and an electric motor configured to drive the pair of rear wheel assemblies and at least partially positioned directly beneath the second seat bottom.

* * * * *